US011418808B2

(12) United States Patent
Ahn

(10) Patent No.: US 11,418,808 B2
(45) Date of Patent: Aug. 16, 2022

(54) METHOD AND DEVICE FOR ENCODING OR DECODING IMAGE ON BASIS OF INTER MODE

(71) Applicant: DIGITALINSIGHTS INC., Seoul (KR)

(72) Inventor: Yong Jo Ahn, Seoul (KR)

(73) Assignee: DIGITALINSIGHTS INC., Seoul (KR)

( * ) Notice: Subject to any disclaimer, the term of this patent is extended or adjusted under 35 U.S.C. 154(b) by 0 days.

(21) Appl. No.: 17/353,683

(22) Filed: Jun. 21, 2021

(65) Prior Publication Data

US 2022/0086459 A1 Mar. 17, 2022

Related U.S. Application Data

(63) Continuation of application No. 17/280,099, filed as application No. PCT/KR2019/012439 on Sep. 25, 2019.

(30) Foreign Application Priority Data

Sep. 25, 2018 (KR) .................. 10-2018-0114556
Sep. 26, 2018 (KR) .................. 10-2018-0114569
(Continued)

(51) Int. Cl.
| *H04N 19/105* | (2014.01) |
| *H04N 19/176* | (2014.01) |
| *H04N 19/119* | (2014.01) |
| *H04N 19/577* | (2014.01) |
| *H04N 19/159* | (2014.01) |

(Continued)

(52) U.S. Cl.
CPC ......... *H04N 19/577* (2014.11); *H04N 19/105* (2014.11); *H04N 19/119* (2014.11);
(Continued)

(58) Field of Classification Search
CPC .. H04N 19/105; H04N 19/159; H04N 19/119; H04N 19/176; H04N 19/52; H04N 19/577
See application file for complete search history.

(56) References Cited

U.S. PATENT DOCUMENTS

| 2011/0200111 A1* | 8/2011 | Chen ................... H04N 19/615 375/240.16 |
| 2013/0202037 A1* | 8/2013 | Wang .................. H04N 19/577 375/240.15 |

(Continued)

FOREIGN PATENT DOCUMENTS

| WO | WO 2016/008408 A1 | 1/2016 |
| WO | WO 2017/148345 A1 | 9/2017 |

(Continued)

OTHER PUBLICATIONS

DigitalInsights Inc., International Search Report / Written Opinion, International Application No. PCT/KR2019/012439, Jan. 3, 2020, 8 pgs.

(Continued)

Primary Examiner — Jeremiah C Hallenbeck-Huber
(74) Attorney, Agent, or Firm — Morgan, Lewis & Bockius LLP

(57) ABSTRACT

In a method and a device for encoding or decoding an image according to the present invention, motion information for bidirectional prediction of a current block may be derived on the basis of an inter mode previously defined in the device for encoding or decoding an image, and inter prediction may be performed on the current block on the basis of the motion information, wherein the motion information for bidirectional prediction is adjusted to be motion information for unidirectional prediction according to the predefined inter mode.

5 Claims, 17 Drawing Sheets

(30) Foreign Application Priority Data

Oct. 4, 2018 (KR) .................. 10-2018-0118133
Oct. 23, 2018 (KR) .................. 10-2018-0126400

(51) Int. Cl.
*H04N 19/513* (2014.01)
*H04N 19/52* (2014.01)

(52) U.S. Cl.
CPC ......... *H04N 19/159* (2014.11); *H04N 19/176* (2014.11); *H04N 19/513* (2014.11); *H04N 19/52* (2014.11)

(56) References Cited

U.S. PATENT DOCUMENTS

| | | | | |
|---|---|---|---|---|
| 2014/0294078 A1* | 10/2014 | Seregin | ................ | H04N 19/577 375/240.15 |
| 2017/0286805 A1* | 10/2017 | Yu | ................ | G06K 9/3258 |
| 2018/0098063 A1 | 4/2018 | Chen et al. | | |
| 2018/0124398 A1* | 5/2018 | Park | ................ | H04N 19/119 |
| 2018/0192069 A1 | 7/2018 | Chen et al. | | |
| 2019/0058896 A1 | 2/2019 | Huang et al. | | |
| 2019/0089961 A1* | 3/2019 | Ahn | ................ | H04N 19/159 |
| 2021/0243461 A1* | 8/2021 | Park | ................ | H04N 19/105 |

FOREIGN PATENT DOCUMENTS

| | | |
|---|---|---|
| WO | WO 2018/061563 A1 | 4/2018 |
| WO | WO 2020/067709 A1 | 4/2020 |

OTHER PUBLICATIONS

Ahn, Non-Final Office Action, U.S. Appl. No. 17/280,099, dated Jun. 9, 2022, 7 pgs.

* cited by examiner

METHOD AND DEVICE FOR ENCODING OR DECODING IMAGE ON BASIS OF INTER MODE

CROSS REFERENCE TO RELATED APPLICATIONS

This application is a continuation of U.S. patent application Ser. No. 17/280,099, filed Mar. 25, 2021, which is a United States National Stage Application filed under 35 U.S.C. § 371 of PCT Patent Application Serial No. PCT/KR2019/012439 filed on Sep. 25, 2019, which claims the benefit of and priority to Korean Patent Application Nos. 10-2018-0126400, filed Oct. 23, 2018, 10-2018-0118133, filed Oct. 4, 2018, 10-2018-0114569, filed Sep. 26, 2018, and 10-2018-0114556, filed Sep. 25, 2018. U.S. patent application Ser. No. 17/280,099, filed Mar. 25, 2021, is hereby incorporated by reference in its entirety.

TECHNICAL FIELD

The present disclosure relates to a video encoding/decoding method and apparatus.

BACKGROUND ART

As a demand for high-resolution and high-definition video has recently increased, a need for a high-efficiency video compression technology for next-generation video services has emerged. Based on this need, ISO/IEC MPEG and ITU-T VCEG, which jointly standardized H.264/AVC and HEVC video compression standards, formed JVET (Joint Video Exploration Team) and conducted research and exploration to establish a new video compression standard from October 2015. In April 2018, a new video compression standardization was started with an evaluation of a responses to a new video compression standard CfP (Call for Proposal).

In a video compression technique, a block division structure means a unit that performs encoding and decoding, and a unit to which major encoding and decoding techniques such as prediction and transformation are applied. As video compression technology develops, the size of blocks for encoding and decoding is gradually increasing, and more various division types are supported as a block division type. In addition, video compression is performed using not only units for encoding and decoding, but also units subdivided according to the role of blocks.

In the HEVC standard, video encoding and decoding are performed using a unit block subdivided according to a quad-tree type block division structure and a role for prediction and transformation. In addition to the quad-tree type block division structure, various types of block division structures such as QTBT (Quad Tree plus Binary Tree) in the form of combining a quad-tree and a binary-tree, and MTT (Multi-Type Tree) in which a triple-tree is combined therewith have been proposed to improve video coding efficiency. Through the support of various block sizes and various types of block division structures, one picture is divided into multiple blocks, and information in units of coding units such as a coding mode, motion information, and intra prediction direction information corresponding to each block is expressed in various ways, so the number of bits expressing this is increasing significantly.

DISCLOSURE

Technical Problem

An image encoding/decoding method and apparatus according to the present disclosure provides a limited bidirectional prediction method.

An image encoding/decoding method and apparatus according to the present disclosure defines various inter modes for improving an efficiency of inter prediction, and provides a method of inducing motion information according to each inter mode.

An image encoding/decoding method and apparatus according to the present disclosure provides a method of adaptively limiting consumption of a memory bandwidth by using a plurality of motion vectors.

An image encoding/decoding method and apparatus according to the present disclosure provides a hierarchical division method of a picture.

Technical Solution

An image encoding/decoding method and apparatus according to the present disclosure may derive motion information for bidirectional prediction of a current block, based on an inter mode pre-defined in an image decoding apparatus, and perform inter prediction on the current block based on the motion information.

In the image encoding/decoding method and apparatus according to the present disclosure, according to the pre-defined inter mode, the motion information for the bidirectional prediction may be adjusted to motion information for unidirectional prediction.

In the image encoding/decoding method and apparatus according to the present disclosure, when the pre-defined inter mode is a merge mode, the motion information for the bidirectional prediction may be adjusted to motion information for unidirectional prediction, and when the pre-defined inter mode is an affine mode, the motion information for the bidirectional prediction may be not adjusted to motion information for unidirectional prediction.

In the image encoding/decoding method and apparatus according to the present disclosure, when the pre-defined inter mode is a merge mode, the motion information for the bidirectional prediction may be adjusted to motion information for unidirectional prediction in consideration of a size of the current block.

In the image encoding/decoding method and apparatus according to the present disclosure, when the pre-defined inter mode is a merge mode, the deriving of the motion information may comprise constructing a merge candidate list of the current block, and deriving motion information of the current block from the merge candidate list.

In the image encoding/decoding method and apparatus according to the present disclosure, the merge candidate list may include at least one of a spatial merge candidate, a temporal merge candidate, or a combined merge candidate.

In the image encoding/decoding method and apparatus according to the present disclosure, when the pre-defined inter mode is an affine mode, the deriving of the motion information may comprise generating a candidate list consisting of affine candidates of the current block, deriving a control point vector of the current block based on the candidate list and a candidate index, and deriving a motion vector of the current block based on the control point vector of the current block.

In the image encoding/decoding method and apparatus according to the present disclosure, the affine candidates may include at least one of a spatial candidate, a temporal candidate, or a configured candidate.

In the image encoding/decoding method and apparatus according to the present disclosure, in consideration of a size of a predetermined reference region, a motion vector of the current block is derived, and the reference region includes a reference block specified by motion vectors of n sub-blocks and a pixel used to interpolate a fractional pel of the reference block.

In the image encoding/decoding method and apparatus according to the present disclosure, when the size of the reference region is less than or equal to a threshold value, the motion vector of the current block may be derived for each sub-block, and when the size of the reference region is greater than the threshold value, one motion vector may be derived for the current block.

In the image encoding/decoding method and apparatus according to the present disclosure, the motion vector of the current block may be derived based on an affine motion parameter, and the affine motion parameter may be calculated based on the control point vector of the current block.

In the image encoding/decoding method and apparatus according to the present disclosure, the current block may belong to a predetermined sub-picture, and the sub-picture may be defined as a group of grids having the same index among a plurality of grids constituting one picture.

Advantageous Effects

The present disclose may allow bidirectional prediction only when a predetermined condition is satisfied, or may reduce the consumption of a memory bandwidth by adjusting a motion vector.

According to the present disclosure, an efficiency of inter prediction may be improved by using a combined merge candidate in addition to spatial/temporal merge candidates.

According to the present disclosure, an efficiency of image encoding/decoding may be improved through inter prediction based on an affine motion model.

According to the present disclosure, an efficiency of image encoding/decoding may be improved by dividing one picture into multi-level fragment regions.

BEST MODE FOR INVENTION

Figure 1:
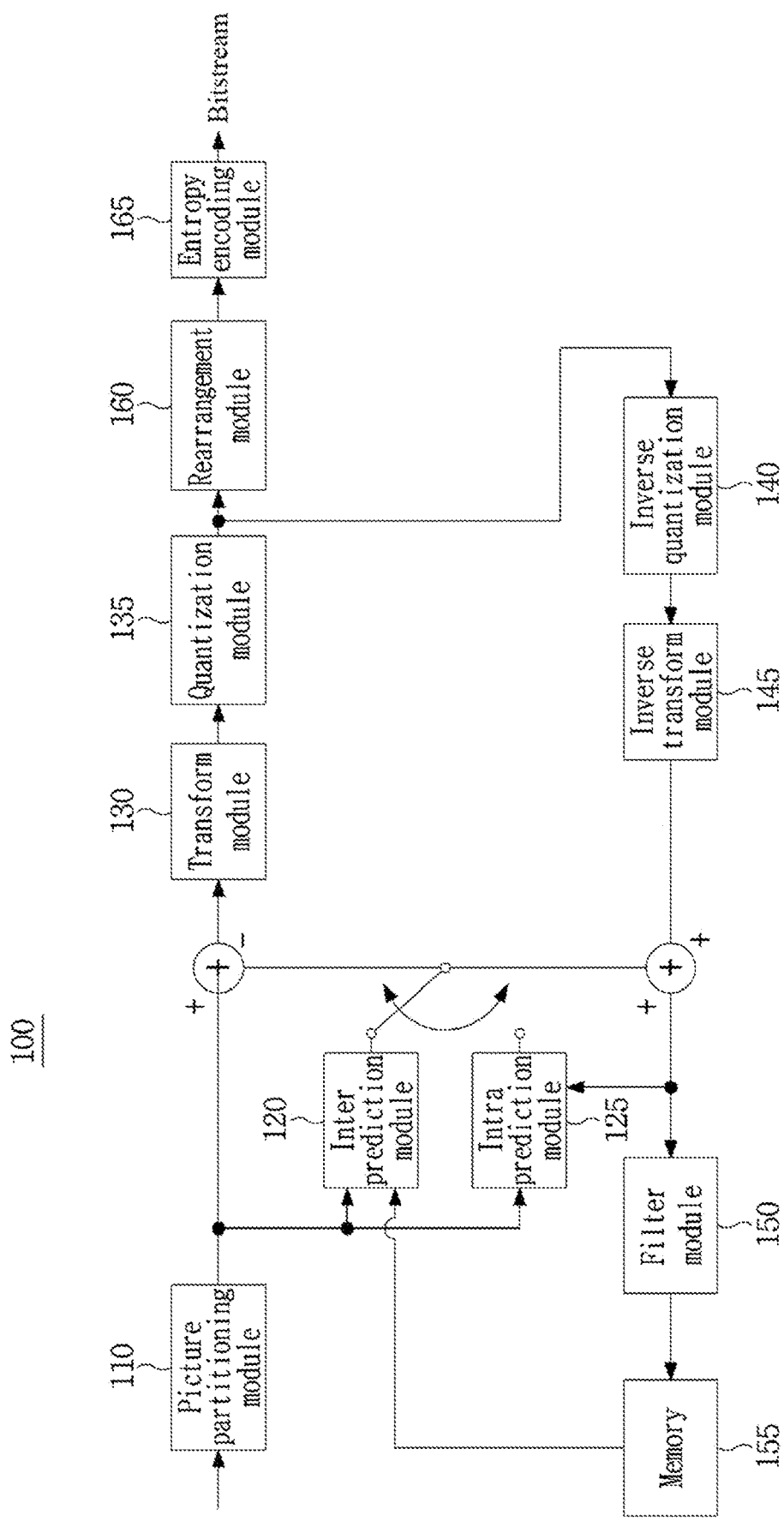
FIG. 1 is a block diagram showing an image encoding apparatus according to the present disclosure.

An image encoding/decoding method and apparatus according to the present disclosure may derive motion information for bidirectional prediction of a current block, based on an inter mode pre-defined in an image decoding apparatus, and perform inter prediction on the current block based on the motion information.

In the image encoding/decoding method and apparatus according to the present disclosure, according to the pre-defined inter mode, the motion information for the bidirectional prediction may be adjusted to motion information for unidirectional prediction.

In the image encoding/decoding method and apparatus according to the present disclosure, when the pre-defined inter mode is a merge mode, the motion information for the bidirectional prediction may be adjusted to motion information for unidirectional prediction, and when the pre-defined inter mode is an affine mode, the motion information for the bidirectional prediction may be not adjusted to motion information for unidirectional prediction.

In the image encoding/decoding method and apparatus according to the present disclosure, when the pre-defined inter mode is a merge mode, the motion information for the bidirectional prediction may be adjusted to motion information for unidirectional prediction in consideration of a size of the current block.

In the image encoding/decoding method and apparatus according to the present disclosure, when the pre-defined inter mode is a merge mode, the deriving of the motion information may comprise constructing a merge candidate list of the current block, and deriving motion information of the current block from the merge candidate list.

In the image encoding/decoding method and apparatus according to the present disclosure, the merge candidate list may include at least one of a spatial merge candidate, a temporal merge candidate, or a combined merge candidate.

In the image encoding/decoding method and apparatus according to the present disclosure, when the pre-defined inter mode is an affine mode, the deriving of the motion information may comprise generating a candidate list consisting of affine candidates of the current block, deriving a control point vector of the current block based on the candidate list and a candidate index, and deriving a motion vector of the current block based on the control point vector of the current block.

In the image encoding/decoding method and apparatus according to the present disclosure, the affine candidates may include at least one of a spatial candidate, a temporal candidate, or a configured candidate.

In the image encoding/decoding method and apparatus according to the present disclosure, in consideration of a size of a predetermined reference region, a motion vector of the current block is derived, and the reference region includes a reference block specified by motion vectors of n sub-blocks and a pixel used to interpolate a fractional pel of the reference block.

In the image encoding/decoding method and apparatus according to the present disclosure, when the size of the reference region is less than or equal to a threshold value, the motion vector of the current block may be derived for each sub-block, and when the size of the reference region is greater than the threshold value, one motion vector may be derived for the current block.

In the image encoding/decoding method and apparatus according to the present disclosure, the motion vector of the current block may be derived based on an affine motion parameter, and the affine motion parameter may be calculated based on the control point vector of the current block.

In the image encoding/decoding method and apparatus according to the present disclosure, the current block may belong to a predetermined sub-picture, and the sub-picture may be defined as a group of grids having the same index among a plurality of grids constituting one picture.

MODE FOR INVENTION

Hereinafter, embodiments of the present disclosure will be described in detail with reference to the accompanying drawings in the present specification so that those of ordinary skill in the art may easily implement the present disclosure. However, the present disclosure may be implemented in various different forms and is not limited to the embodiments described herein. In the drawings, parts irrelevant to the description are omitted in order to clearly describe the present disclosure, and similar reference numerals are attached to similar parts throughout the specification.

Throughout this specification, when a certain part is said to be 'connected' with another part, this includes not only the case where it is directly connected, but also the case where it is electrically connected with another element in the middle. In addition, in the entire specification, when a certain part "includes" a certain component, it means that other components may be further included rather than excluding other components unless otherwise stated.

The terms 'step (to)~' or 'step of ~' as used throughout this specification does not mean 'step for ~'. In addition, terms such as first and second may be used to describe various elements, but the elements should not be limited to the terms. The above terms are used only for the purpose of distinguishing one component from another component.

In addition, the components shown in the embodiment of the present disclosure are shown independently to represent different characteristic functions, it does not mean that each component is made of separate hardware or a single software component unit. That is, each component unit is described by being listed as a respective component unit for convenience of description, and at least two of the component units are combined to form one component unit, or one component unit may be divided into a plurality of component units to perform a function. An integrated embodiment and a separate embodiment of each of these components are also included in the scope of the present disclosure as long as they do not depart from the essence of the present disclosure.

In the various embodiments of the present disclosure described herein below, terms such as "~ unit", "~ group", "~ unit", "~ module", and "~ block" mean units that process at least one function or operation, and they may be implemented in hardware or software, or a combination of hardware and software.

In addition, a coding block refers to a processing unit of a set of target pixels on which encoding and decoding are currently performed, and may be used interchangeably as a coding block and a coding unit. In addition, the coding unit refers to a coding unit (CU) and may be generically referred to including a coding block (CB).

In addition, quad-tree division refers to that one block is divided into four independent coding units, and binary division refers to that one block is divided into two independent coding units. In addition, ternary division refers to that one block is divided into three independent coding units in a 1:2:1 ratio.

FIG. 1 is a block diagram showing an image encoding apparatus according to the present disclosure.

Referring to FIG. 1, a video encoding apparatus 100 may include: a picture dividing module 110, prediction modules 120 and 125, a transform module 130, a quantization module 135, a rearrangement module 160, an entropy encoding module 165, an inverse quantization module 140, an inverse transform module 145, a filter module 150, and a memory 155.

A picture dividing module 110 may divide an input picture into one or more processing units. Herein, the processing unit may be a prediction unit (PU), a transform unit (TU), or a coding unit (CU). Hereinafter, in an embodiment of the present disclosure, a coding unit may be used as a unit that performs encoding or a unit that performs decoding.

A prediction unit may be resulting from dividing one coding unit into at least one square or non-square of the same size, and it may be divided such that one prediction unit among prediction units divided within one coding unit has a different shape and/or size from another prediction unit. When it is not a minimum coding unit in generating a prediction unit which performs intra prediction based on a coding unit, intra prediction may be performed without dividing the coding unit into a plurality of prediction units N×N.

Prediction modules 120 and 125 may include an inter prediction module 120 performing inter prediction and an intra prediction module 125 performing intra prediction. Whether to perform inter prediction or intra prediction for a prediction unit may be determined, and detailed information (e.g., an intra prediction mode, a motion vector, a reference picture, etc.) according to each prediction method may be determined. A residual value (residual block) between a generated prediction block and an original block may be input to a transform module 130. In addition, prediction mode information, motion vector information, etc. used for prediction may be encoded together with a residual value by an entropy encoding module 165 and may be transmitted to a decoder. However, when a motion information derivation technique from the side of a decoder according to the present disclosure is applied, since an encoder does not generate prediction mode information and motion vector information, the corresponding information is not transmitted to the decoder. On the other hand, it is possible for an encoder to signal and transmit information indicating that motion information is derived and used from the side of a decoder and information on a technique used for inducing the motion information.

A inter prediction module 120 may predict a prediction unit based on information of at least one of a previous picture or a subsequent picture of a current picture, or may predict a prediction unit based on information of some encoded regions in the current picture, in some cases. The inter prediction module 120 may include a reference picture interpolation module, a motion prediction module, and a motion compensation module.

A reference picture interpolation module may receive reference picture information from a memory 155 and may generate pixel information on an integer pixel or less than the integer pixel from the reference picture. In the case of luma pixels, an 8-tap DCT-based interpolation filter having different filter coefficients may be used to generate pixel information on an integer pixel or less than the integer pixel in a unit of a ¼ pixel. In the case of chroma signals, a 4-tap DCT-based interpolation filter having different filter coefficients may be used to generate pixel information on an integer pixel or less than the integer pixel in a unit of a ⅛ pixel.

A motion prediction module may perform motion prediction based on a reference picture interpolated by a reference picture interpolation module. As a method for obtaining a motion vector, various methods such as a full search-based block matching algorithm (FBMA), a three step search (TSS), and a new three-step search algorithm (NTS) may be used. A motion vector may have a motion vector value in a unit of a ½ pixel or a ¼ pixel based on an interpolated pixel. A motion prediction module may predict a current prediction unit by using various motion prediction methods. As a motion prediction method, various methods such as a skip method, a merge method, an Advanced Motion Vector Prediction (AMVP) method, and an intra block copy method may be used. In addition, when applying a motion information derivation technique from the side of a decoder according to the present disclosure, as a method performed by a motion prediction module, a template matching method and a bilateral matching method using a motion trajectory may be applied. In connection, the template matching method and the bilateral matching method will be described in detail later in FIG. 3.

An intra prediction module 125 may generate a prediction unit based on reference pixel information neighboring to a current block which is pixel information in the current picture. When a neighboring block of a current prediction unit is a block on which inter prediction has been performed and a reference pixel is a pixel on which inter prediction has been performed, a reference pixel included in a block on which inter prediction has been performed may be replaced with reference pixel information of a neighboring block on which intra prediction has been performed. In other words, when a reference pixel is not available, information on a reference pixel that is not available may be replaced with at least one reference pixel among available reference pixels.

In addition, a residual block including residual information that is a difference between a prediction unit on which prediction has been performed based on the prediction unit generated by prediction modules 120 and 125 and an original block of the prediction unit may be generated. The generated residual block may be input to a transform module 130.

A transform module 130 may transform a residual block including residual information between an original block and a prediction unit generated by prediction modules 120 and 125 using a transform method such as discrete cosine transform (DCT), discrete sine transform (DST), and KLT. Whether to apply DCT, DST, or KLT in order to transform a residual block may be determined based on intra prediction mode information of a prediction unit used to generate a residual block.

A quantization module 135 may quantize values transformed to a frequency domain by a transform module 130. Quantization coefficients may vary depending on a block or importance of a picture. The values calculated by a quantization module 135 may be provided to an inverse quantization module 140 and a rearrangement module 160.

A rearrangement module 160 may rearrange coefficient values on quantized residual values.

A rearrangement module 160 may change coefficients in the form of a two-dimensional block into coefficients in the form of a one-dimensional vector through a coefficient scanning method. For example, a rearrangement module 160 may scan from DC coefficients to coefficients in a high frequency domain using zig-zag scanning method so as to change the coefficients to be in the form of a one-dimensional vector. Depending on a size of a transform unit and an intra prediction mode, vertical scanning where coefficients in the form of a two-dimensional block are scanned in a column direction or horizontal scanning where coefficients in the form of a two-dimensional block are scanned in a row direction may be used instead of zig-zag scanning. In other words, which scanning method among zig-zag scanning, vertical scanning, and horizontal scanning is used may be determined depending on a size of a transform unit and an intra prediction mode.

An entropy encoding module 165 may perform entropy encoding based on values calculated by a rearrangement module 160. Entropy encoding may use various encoding methods such as Exponential Golomb, Context-Adaptive Variable Length Coding (CAVLC), and Context-Adaptive Binary Arithmetic Coding (CABAC). In relation to this, an entropy encoding module 165 may encode residual value coefficient information of a coding unit from a rearrangement module 160 and prediction modules 120 and 125. In addition, according to the present disclosure, information indicating that motion information is derived and used at a decoder side and information on a technique used to derive motion information may be signaled and transmitted.

An inverse quantization module 140 and an inverse transform module 145 may inversely quantize values quantized by a quantization module 135 and inversely transform values transformed by a transform module 130. A residual value generated by an inverse quantization module 140 and an inverse transform module 145 may be combined with a prediction unit predicted through a motion prediction module, motion compensation module, and intra prediction module included in prediction modules 120 and 125 to generate a reconstructed block.

A filter module 150 may include at least one of a deblocking filter, an offset correction module, or an adaptive loop filter (ALF). A deblocking filter may remove block distortion that occurs due to boundaries between blocks in a reconstructed picture. An offset correction module may correct offset with respect to an original image in a unit of a pixel in a deblocking filtered image. In order to perform offset correction on a particular picture, a method of applying offset in consideration of edge information of each pixel or a method of partitioning pixels included in an image into the predetermined number of regions, determining a region to be subjected to perform offset, and applying the offset to the determined region may be used. Adaptive loop filtering (ALF) may be performed based on a value obtained by comparing a filtered reconstructed image and an original image. After partitioning pixels included in an image into predetermined groups, one filter to be applied to the corresponding group may be determined, and filtering may be performed differentially for each group.

A memory 155 may store a reconstructed block or picture calculated through a filter module 150. The stored reconstructed block or picture may be provided to prediction modules 120 and 125 in performing inter prediction.

Figure 2:
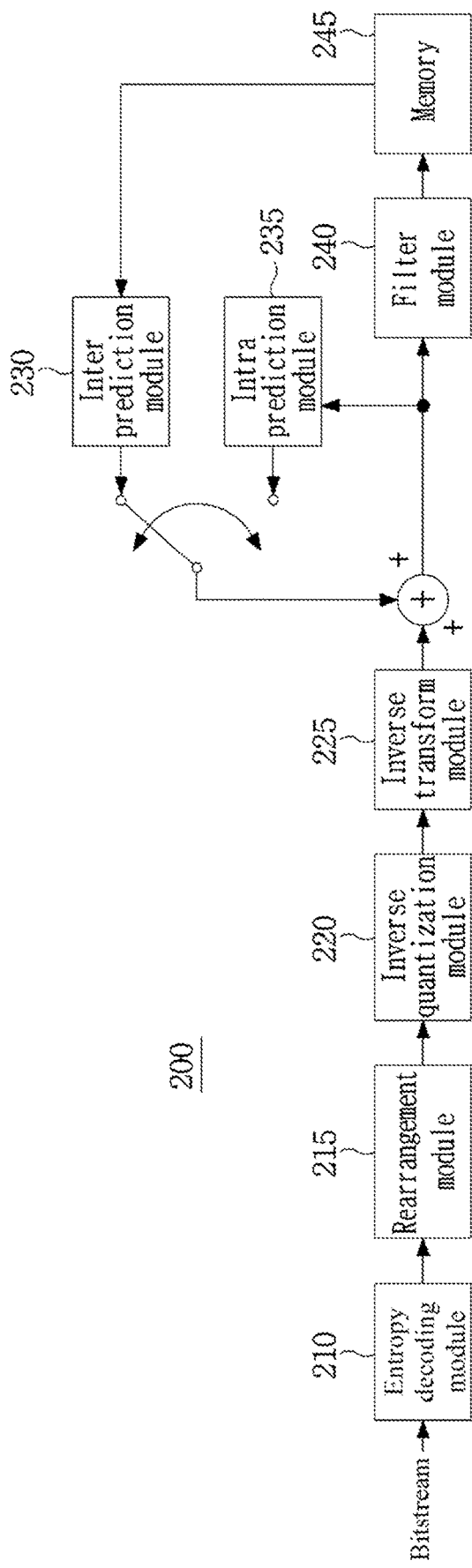
FIG. 2 is a block diagram showing an image decoding apparatus according to the present disclosure.

FIG. 2 is a block diagram showing an image decoding apparatus according to the present disclosure.

Referring to FIG. 2, an apparatus 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input to an apparatus for decoding a video, the input bitstream may be decoded according to an inverse process of an apparatus for encoding a video.

An entropy decoding module 210 may perform entropy decoding according to an inverse process of entropy encoding by an entropy encoding module of a video encoding apparatus. For example, corresponding to methods performed by a video encoding apparatus, various methods such as Exponential Golomb, Context-Adaptive Variable Length Coding (CAVLC), and Context-Adaptive Binary Arithmetic Coding (CABAC) may be applied.

An entropy decoding module 210 may decode information on intra prediction and inter prediction performed by an encoding apparatus.

A rearrangement module 215 may perform rearrangement on a bitstream entropy decoded by an entropy decoding module 210 based on a rearrangement method used in an encoding apparatus. A rearrangement module may reconstruct and rearrange coefficients in the form of a one-dimensional vector to coefficients in the form of a two-dimensional block.

An inverse quantization module 220 may perform inverse quantization based on a quantization parameter received from an encoding apparatus and rearranged coefficients of a block.

An inverse transform module 225 may perform inverse transform, i.e., inverse DCT, inverse DST, and inverse KLT, which corresponds to a transform, i.e., DCT, DST, and KLT, performed by a transform module, on a quantization result by an apparatus for encoding a video. Inverse transform may be performed based on a transmission unit determined by a video encoding apparatus. In an inverse transform module 225 of a video decoding apparatus, transform schemes (e.g., DCT, DST, and KLT) may be selectively performed depending on multiple pieces of information such as a prediction method, a size of a current block, and a prediction direction.

Prediction modules 230 and 235 may generate a prediction block based on information on prediction block generation received from an entropy decoding module 210 and information on a previously decoded block or picture received from a memory 245.

As described above, if a size of a prediction unit and a size of a transform unit are the same when intra prediction is performed in the same manner as an operation of a video encoding apparatus, intra prediction may be performed on a prediction unit based on pixels existing on the left, upper left, and top of a prediction unit. However, if the size of the prediction unit and the size of the transform unit are different when the intra prediction is performed, intra prediction may be performed using a reference pixel based on a transform unit. In addition, intra prediction using N×N division may be used only for the minimum coding unit.

Prediction modules 230 and 235 may include a prediction unit determination module, an inter prediction module, and an intra prediction module. A prediction unit determination module may receive a variety of information, such as prediction unit information, prediction mode information of an intra prediction method, and information on motion prediction of an inter prediction method, from an entropy decoding module 210, may divide a current coding unit into prediction units, and may determine whether inter prediction or intra prediction is performed on the prediction unit. On the other hand, if an encoder 100 does not transmit information related to motion prediction for inter prediction, but transmit information indicating that motion information is derived and used from the side of a decoder and information about a technique used for deriving motion information, the prediction unit determination module determines prediction performance of an inter prediction module 230 based on the information transmitted from the encoder 100.

An inter prediction module 230 may perform inter prediction on a current prediction unit based on information of at least one of a previous picture or a subsequent picture of the current picture including the current prediction unit using information required for inter prediction of the current prediction unit provided by a video encoding apparatus. In order to perform inter prediction, based on a coding block, it may be determined whether a motion prediction method of a prediction unit included in a corresponding coding unit is a skip mode, a merge mode, an AMVP mode, or an intra block copy mode. Alternatively, the inter prediction module 230 may itself derive motion information from information indicating that motion information is derived and used from the side of a decoder and information about a technique used to induce motion information provided by a video encoder, and then perform inter prediction.

An intra prediction module 235 may generate a prediction block based on pixel information in a current picture. When a prediction unit is a prediction unit subjected to intra prediction, intra prediction may be performed based on intra prediction mode information of the prediction unit received from a video encoding apparatus. An intra prediction module 235 may include an adaptive intra smoothing (AIS) filter, a reference pixel interpolation module, and a DC filter. An AIS filter performs filtering on a reference pixel of a current block, and whether to apply the filter may be determined depending on a prediction mode of a current prediction unit. AIS filtering may be performed on a reference pixel of a current block by using a prediction mode of a prediction unit and AIS filter information received from an apparatus for encoding a video. When a prediction mode of a current block is a mode where AIS filtering is not performed, an AIS filter may not be applied.

When a prediction mode of a prediction unit is a prediction unit that performs intra prediction based on a pixel value interpolated by a reference pixel, a reference pixel interpolation module may interpolate a reference pixel to generate a reference pixel in a unit of pixel equal to an integer pixel or less than the integer pixel. When a prediction mode of a current prediction unit is a prediction mode in which a prediction block is generated without interpolating a reference pixel, a reference pixel may not be interpolated. A DC filter may generate a prediction block through filtering when a prediction mode of a current block is a DC mode.

A reconstructed block or picture may be provided to a filter module 240. A filter module 240 may include a deblocking filter, an offset correction module, and an ALF.

Information on whether a deblocking filter is applied to a corresponding block or picture and information on which of a strong filter and a weak filter is applied when the deblocking filter is applied may be received from a video encoding apparatus. A deblocking filter of a video decoding apparatus may receive information on a deblocking filter from a video encoding apparatus, and may perform deblocking filtering on a corresponding block.

An offset correction module may perform offset correction on a reconstructed image based on a type of offset correction and offset value information applied to an image in performing encoding. An ALF may be applied to a coding unit based on information on whether to apply the ALF, ALF coefficient information, etc. received from an encoding apparatus. The ALF information may be provided as being included in a particular parameter set.

A memory 245 may store a reconstructed picture or block for use as a reference picture or block, and may provide a reconstructed picture to an output module.

Figure 3:
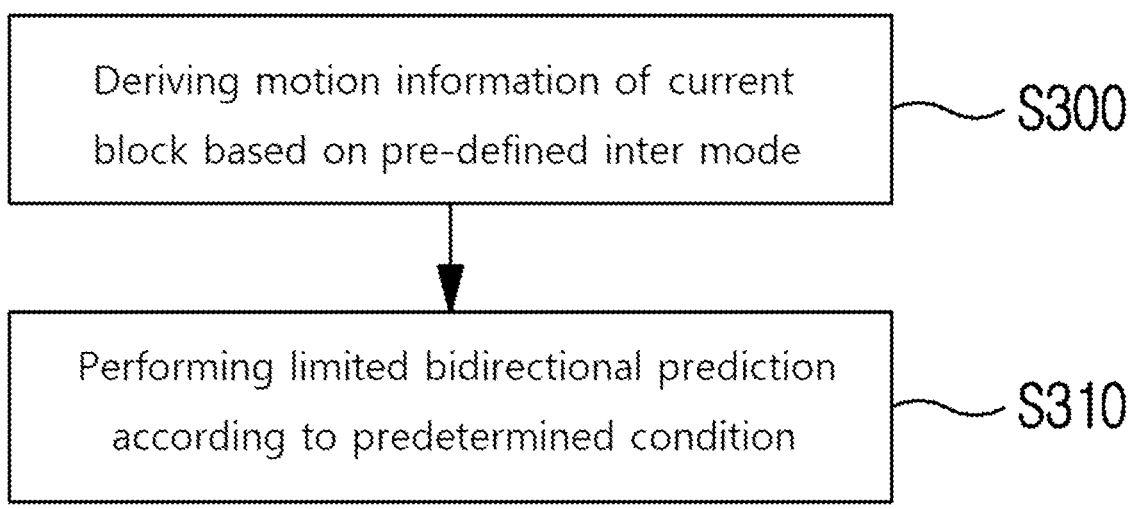
FIG. 3 illustrates a limited bidirectional prediction process as an embodiment to which the present disclosure is applied.

FIG. 3 illustrates a limited bidirectional prediction process as an embodiment to which the present disclosure is applied.

Referring to FIG. 3, motion information of a current block may be derived based on an inter mode pre-defined in an encoding/decoding apparatus (S300).

A pre-defined inter mode according to the present disclosure may include at least one of a merge mode, an AMVP mode, an affine mode, or an intra block copy mode. Herein, motion information may be variously interpreted as a motion vector prediction value, a motion vector, a control point vector prediction value, a control point vector, a block vector, and the like according to an inter mode.

1. Merge Mode

In the case of a merge mode, motion information of a current block may be set to be the same as motion information of a merge candidate. In this way, motion information is derived through merging with a merge candidate, and a separate motion vector difference value (mvd) is not signaled. Hereinafter, a method of inducing motion information based on a merge mode will be described in detail.

First, a merge candidate list of a current block may be configured (S1). A merge candidate list may include at least one of a spatial merge candidate or a temporal merge candidate of a current block.

Motion information of a spatial merge candidate may be derived from motion information of a spatial neighboring block of a current block. Herein, the spatial neighboring block may be a block belonging to the same picture as the current block, and may mean a block adjacent to the current block. A spatial neighboring block may include a block adjacent to at least one of a left, top, top right, bottom left, or top left of a current block. A top left neighboring block may be used only when at least one of blocks adjacent to a left, top, top right and bottom left of a current block is not available.

Motion information of a temporal merge candidate may be derived from motion information of a temporal neighboring block of a current block. The temporal neighboring block may be a block belonging to a picture different from the current block and may be defined as a block at the same position as the current block. Herein, the block at the same position may mean at least one of a block (BR) adjacent to a bottom right corner of the current block, a block (CTR) including a position of a center sample of the current block, or a block (TL) including a position of a top left sample of the current block. Alternatively, the block at the same position may mean a block including a position shifted by a predetermined disparity vector from a position of a top left sample of the current block. Herein, the disparity vector may be determined based on any one of motion vectors of the spatial neighboring block described above. Alternatively, the disparity vector may be determined based on a combination of at least two of motion vectors of the spatial neighboring blocks described above. The combination may mean an operation such as a maximum value, a minimum value, a median value, and a weighted average value. For example, a disparity vector may be set as a motion vector of a left neighboring block or a top neighboring block. Alternatively, a disparity vector may be set as a median value or an average value between a motion vector of a left neighboring block and a motion vector of a bottom left neighboring block.

A motion vector and a reference picture index of a temporal merge candidate may be derived from a motion vector and a reference picture index of the above-described temporal neighboring block, respectively. Alternatively, a motion vector of a temporal merge candidate may be derived as a motion vector of a temporal neighboring block, and a reference picture index of the temporal merge candidate may be set to a default value (e.g., 0) pre-promised to a decoding apparatus regardless of the temporal neighboring block.

A merge candidate list may further include a combined merge candidate. The combined merge candidate may be derived by combining n merge candidates belonging to a pre-generated merge candidate list.

Herein, n may be an integer of 2, 3, 4 or more. The number n of merge candidates to be combined may be a fixed value pre-promised to an encoding/decoding apparatus, or may be encoded and signaled by an encoding apparatus. The signaling may be performed in at least one unit of a sequence, a picture, a slice, a tile, a sub-tile (brick), or a predetermined block. The number n of merge candidates to be combined may be variably determined based on the number of remaining merge candidates. Herein, the number of remaining merge candidates may mean a difference between the maximum number of merge candidates that can be included in a merge candidate list and the current number of merge candidates in the merge candidate list. The maximum number may be a number pre-promised to an encoding/decoding apparatus, or may be encoded and signaled by an encoding apparatus. The current number may mean the number of merge candidates configured before adding a combined merge candidate. For example, when the number of remaining merge candidates is 1, two merge candidates may be used, and when the number of remaining merge candidates is greater than 1, three or more merge candidates may be used.

The positions of the n merge candidates may be predetermined positions in a merge candidate list. For example, indexes (0 to (k−1)) may be allocated for each merge candidate belonging to a merge candidate list. Herein, k may mean the total number of merge candidates included in a merge candidate list. In this case, the positions of n merge candidates may correspond to index 0 to index (n−1) in a merge candidate list. Alternatively, the n merge candidates may be determined in consideration of a prediction direction of each merge candidate included in a merge candidate list. For example, among merge candidates belonging to a merge candidate list, only a merge candidate whose prediction direction is a bidirectional prediction may be selectively used, or only a merge candidate whose prediction direction is a unidirectional prediction may be selectively used.

A combined merge candidate may be derived using both a spatial merge candidate and a temporal merge candidate, or may be derived using only one of a spatial merge candidate or a temporal merge candidate. For example, a combined merge candidate may be limited to be derived using only spatial merge candidates. In this case, the number of merge candidates to be combined may be limited within the number of spatial merge candidates belonging to a pre-generated merge candidate list.

The combined merge candidate may be added after spatial/temporal merge candidates in a merge candidate list. That is, an index of a combined merge candidate may be larger than indices of spatial/temporal merge candidates. Alternatively, the combined merge candidate may be added between a spatial merge candidate and a temporal merge candidate in a merge candidate list. That is, an index of a combined merge candidate may be larger than indices of spatial merge candidates and smaller than indices of temporal merge candidates. Alternatively, a position of a combined merge candidate may be variably determined in consideration of a prediction direction of the combined merge candidate. Depending on whether a prediction direction of a combined merge candidate is bidirectional prediction, a position of a combined merge candidate in a merge candidate list may be rearranged. For example, when a prediction direction of a combined merge candidate is bidirectional prediction, an index smaller than a spatial or temporal merge candidate may be allocated, otherwise, an index larger than the spatial or temporal merge candidate may be allocated.

Hereinafter, for convenience of description, a method of deriving a combined merge candidate based on two merge candidates will be described.

Motion information of a combined merge candidate may be derived by a weighted average of motion information of a first merge candidate and a second merge candidate. Herein, weights of the weighted average are [1:1], [1:2], [1:3], [2:3], etc., but are not limited thereto. The weight may be pre-defined in an encoding/decoding apparatus or derived from a decoding apparatus. In this case, the weight may be derived by considering at least one of a distance between a current picture and a reference picture of a merge candidate or a prediction direction of a merge candidate. Alternatively, motion information of a combined merge candidate may be derived by obtaining motion information in a L0 direction from the first merge candidate and motion information in a L1 direction from the second merge candidate and combining them. Motion information of a combined merge candidate may be derived based on at least one of the above-described derivation methods, and this may be performed in consideration of a prediction direction of a merge candidate to be combined, as described later.

In this specification, motion information may include at least one of a prediction direction flag, a reference picture index, or a motion vector. The motion information may be defined for L0 prediction and L1 prediction, respectively. Herein, L0 prediction may mean prediction referring to a reference picture list L0, and L1 prediction may mean prediction referring to a reference picture list L1.

(1) When prediction directions of a first merge candidate and a second merge candidate are both unidirectional prediction,

[CASE 1] When a first merge candidate is L0 prediction and a second merge candidate is L1 prediction, a reference picture index of a combined merge candidate in a L0 direction may be derived as a reference picture index of the first merge candidate. A prediction direction flag in a L0 direction of a combined merge candidate may be derived as 1. A motion vector of a combined merge candidate in a L0 direction may be derived as a motion vector of a first merge candidate. A reference picture index of a combined merge candidate in a L1 direction may be derived as a reference picture index of a second merge candidate. A prediction direction flag in a L1 direction of a combined merge candidate may be derived as 1. A motion vector of a combined merge candidate in a L1 direction may be derived as a motion vector of a second merge candidate.

[CASE 2] When a first merge candidate is L1 prediction and a second merge candidate is L0 prediction, a reference picture index of a combined merge candidate in a L0 direction may be derived as a reference picture index of the second merge candidate. A prediction direction flag in a L0 direction of a combined merge candidate may be derived as 1. A motion vector of a combined merge candidate in a L0 direction may be derived as a motion vector of a second merge candidate. A reference picture index of a combined merge candidate in a L1 direction may be derived as a reference picture index of a first merge candidate. A prediction direction flag in a L1 direction of a combined merge candidate may be derived as 1. A motion vector of a combined merge candidate in a L1 direction may be derived as a motion vector of a first merge candidate.

[CASE 3] When a first merge candidate and a second merge candidate are L0 prediction, a reference picture index of a combined merge candidate in a L0 direction may be derived as a reference picture index of either the first merge candidate or the second merge candidate. For example, a reference picture index of a merge candidate having the smallest index among a first merge candidate and a second merge candidate may be set as a reference picture index of a combined merge candidate in a L0 direction. A prediction direction flag in a L0 direction of a combined merge candidate may be derived as 1. A motion vector of a combined merge candidate in a L0 direction may be derived as a weighted average of a motion vector of a first merge candidate and a motion vector of a second merge candidate. A reference picture index in a L1 direction of a combined merge candidate may be derived as −1, a prediction direction flag in a L1 direction may be derived as 0, and motion information in a L1 direction may be derived as 0.

[CASE 4] When a first merge candidate and a second merge candidate are L1 prediction, a reference picture index in a L0 direction of a combined merge candidate may be derived as −1, a prediction direction flag in a L0 direction may be derived as 0, and motion information in a L0 direction may be derived as 0. A reference picture index of a combined merge candidate in a L1 direction may be derived as a reference picture index of either a first merge candidate or a second merge candidate. For example, a reference picture index of a merge candidate having the smallest index among a first merge candidate and a second merge candidate may be set as a reference picture index of a combined merge candidate in a L1 direction. A prediction direction flag in a L1 direction of a combined merge candidate may be derived as 1. A motion vector of a combined merge candidate in a L1 direction may be derived as a weighted average of a motion vector of a first merge candidate and a motion vector of a second merge candidate.

(2) When prediction directions of a first merge candidate and a second merge candidate are both bidirectional prediction,

[CASE 5] A reference picture index of a combined merge candidate in a L0 direction may be derived as a reference picture index of either a first merge candidate or a second merge candidate. For example, a reference picture index of a merge candidate having the smallest index among a first merge candidate and a second merge candidate may be set as a reference picture index of a combined merge candidate in a L0 direction. A prediction direction flag in a L0 direction of the combined merge candidate may be derived as 1. A motion vector of a combined merge candidate in a L0 direction may be derived as a weighted average of a motion vector of a first merge candidate and a motion vector of a second merge candidate. A reference picture index of a combined merge candidate in a L1 direction may be derived as a reference picture index of either a first merge candidate or a second merge candidate. For example, a reference picture index of a merge candidate having the smallest index among a first merge candidate and a second merge candidate may be set as a reference picture index of a combined merge candidate in the L1 direction. A prediction direction flag in a L1 direction of a combined merge candidate may be derived as 1. A motion vector of a combined merge candidate in a L1 direction may be derived as a weighted average of a motion vector of a first merge candidate and a motion vector of a second merge candidate.

(3) When a prediction direction of a first merge candidate is bidirectional prediction and a prediction direction of a second merge candidate is unidirectional prediction,

[CASE 6] When a second merge candidate is L0 prediction, a reference picture index of a combined merge candidate in a L0 direction may be derived as a reference picture index of either a first merge candidate or the second merge candidate. For example, a reference picture index of a merge candidate having the smallest index among a first merge candidate and a second merge candidate may be set as a reference picture index of a combined merge candidate in a L0 direction. A prediction direction flag in a L0 direction of a combined merge candidate may be derived as 1. A motion vector of a combined merge candidate in a L0 direction may be derived as a weighted average of a motion vector of a first merge candidate and a motion vector of a second merge candidate. A reference picture index of a combined merge candidate in a L1 direction may be derived as a reference picture index of a first merge candidate. A prediction direction flag in a L1 direction of a combined merge candidate may be derived as 1. A motion vector of a combined merge candidate in a L1 direction may be derived as a motion vector of a first merge candidate.

[CASE 7] When a second merge candidate is L1 prediction, a reference picture index in a L0 direction of a combined merge candidate may be derived as a reference picture index of a first merge candidate. A prediction direction flag in a L0 direction of a combined merge candidate may be derived as 1. A motion vector of a combined merge candidate in a L0 direction may be derived as a motion vector of a first merge candidate. A reference picture index of a combined merge candidate in a L1 direction may be derived as a reference picture index of either the first merge candidate or a second merge candidate. For example, a reference picture index of a merge candidate having the smallest index among a first merge candidate and a second merge candidate may be set as a reference picture index of a combined merge candidate in a L1 direction. A prediction direction flag in a L1 direction of the combined merge candidate may be derived as 1. A motion vector of a combined merge candidate in a L1 direction may be derived as a weighted average of a motion vector of a first merge candidate and a motion vector of a second merge candidate.

Motion information of a current block may be derived from the merge candidate list (S2).

Specifically, a merge index of a current block may be signaled. A merge index may specify any one of a plurality of merge candidates belonging to a merge candidate list. A merge candidate having the same index as a merge index may be extracted, and motion information of a current block may be derived using motion information of the extracted merge candidate. For example, a motion vector, a reference picture index, and prediction direction information of a current block may be set to be the same as a motion vector, a reference picture index and prediction direction information of the extracted merge candidate.

2. AMVP Mode

In the case of an AMVP mode, a motion vector of a neighboring block may be set as a motion vector prediction value of a current block. For this purpose, a candidate list consisting of motion vectors of spatial/temporal neighboring blocks may be constructed, and an index specifying any one of a plurality of motion vectors of a candidate list may be signaled. Meanwhile, unlike a merge mode, a motion vector may be reconstructed by adding the motion vector prediction value and a signaled motion vector difference value.

3. Affine Mode

An additional motion model may be used in addition to a translation motion model that considers only parallel movement. For example, it is possible to use a motion model that considers motion such as rotation, perspective, and zoom-in/out as well as parallel movement. This will be referred to as an affine mode. In an affine mode, motion information may be derived in units of predetermined sub-blocks based on a control point vector of a current block. Accordingly, an affine mode may be referred to as an inter mode in units of sub-blocks or a merge mode in units of sub-blocks. This will be described in detail with reference to FIGS. 4 to 7.

4. Intra Block Copy (IBC) Mode

In the case of an IBC mode, it is similar to an AMVP mode in that a motion vector of a neighboring block is set as a block vector prediction value (bvp) of a current block, and a block vector is reconstructed using a signaled block vector difference value (bvd). However, there is a difference in that an IBC mode performs motion compensation based on a pre-restored region in the same picture as a current block, whereas an AMVP mode performs motion compensation based on a pre-restored area in a picture different from a current block.

Referring to FIG. 3, according to a predetermined condition, limited bidirectional prediction may be performed on a current block (S310).

A predetermined condition may include at least one of a condition for a block size or a condition on whether to encode in inter mode in units of sub-blocks. According to a predetermined condition, motion information for bidirectional prediction may be adjusted to motion information for unidirectional prediction. This assumes that motion information derived in S300 is derived for L0 prediction and L1 prediction, respectively, and such limited bidirectional prediction will be described in detail with reference to FIGS. 9 to 13.

Figure 4:
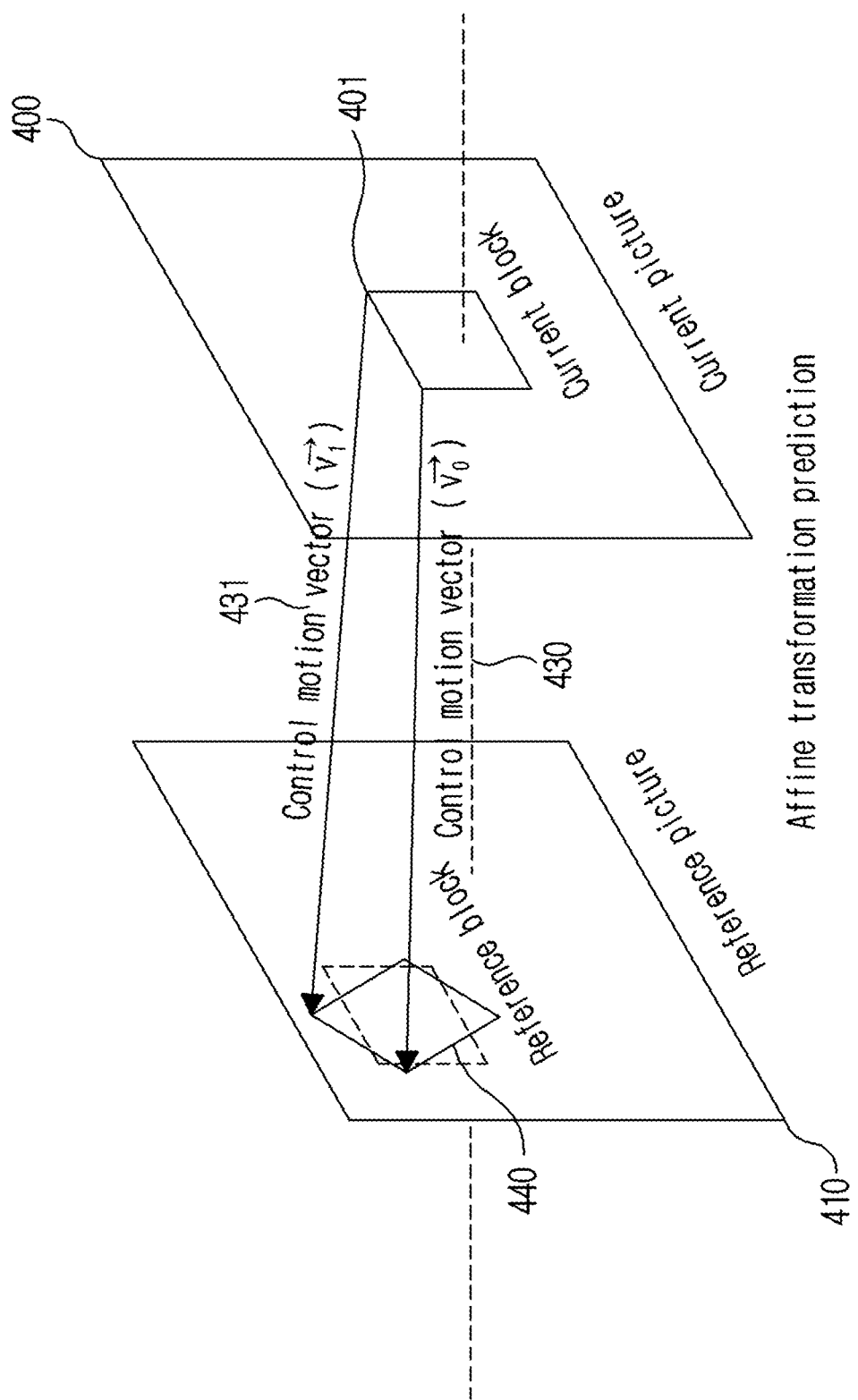
FIG. 4 illustrates a concept of performing inter prediction using affine transform prediction in a video coding method and apparatus according to an embodiment of the present disclosure.

FIG. 4 illustrates a concept of performing inter prediction using affine transform prediction in a video coding method and apparatus according to an embodiment of the present disclosure.

The affine transform prediction means a method of performing prediction in an arbitrary shape by generating a motion vector corresponding to pixels of a reference picture by using affine transform of a pixel in a current block. However, the affine transform prediction is not limited to prediction in units of pixels, and also refers to a method of performing prediction by dividing a current block into a plurality of sub-blocks to obtain a motion vector in units of sub-blocks inclusively.

In a motion prediction method based on affine transformation prediction, in performing prediction with a reference block inside a reference picture 210 for a current block 201 inside a current picture 200, two or more positions representing the block are selected as control points, and rotation and motion prediction of an arbitrary shape are performed using two or more control motion vectors 230 and 231 for the control points. In this case, it includes a method of performing pixel-by-pixel motion prediction by calculating a motion vector for every pixel in a current block 201 using a plurality of control motion vectors, or a method of performing sub-block unit motion prediction by dividing a current block 201 into two or more sub-blocks and calculating a motion vector in units of the sub-blocks.

Figure 5:
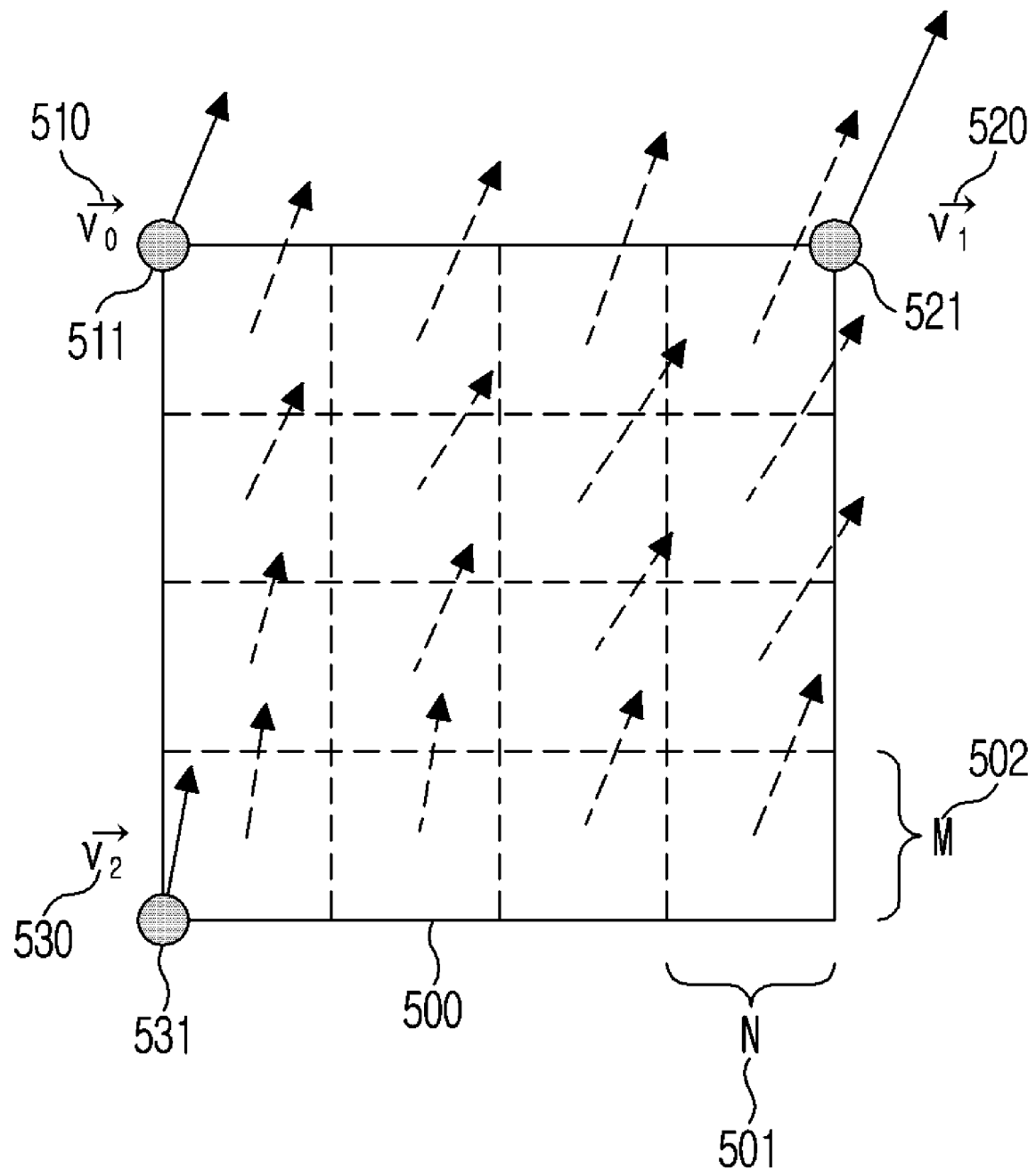
FIG. 5 illustrates a concept of affine transform prediction in units of sub-blocks according to an embodiment of the present disclosure.

FIG. 5 illustrates a concept of affine transform prediction in units of sub-blocks according to an embodiment of the present disclosure.

FIG. 3 is a diagram illustrating an embodiment in which one block is divided into two or more sub-blocks, and inter prediction is performed using each motion vector in units of the sub-blocks. According to an embodiment of the present disclosure, a method of selecting two or more control points representing a current block 300 and transforming and obtaining motion vectors for each of two or more sub-blocks dividing the current block 300 using a motion vector corresponding to the control points. In this case, the meaning of transforming the motion vector may also be used as a meaning of calculating the motion vector.

According to an embodiment of the present disclosure, it includes a method of selecting two or more control points representing a current block 300 and transforming and obtaining each motion vector for two or more sub-blocks dividing a current block 300 by using a motion vector corresponding to the control points. The control points representing a current block 300 may be two points of a top left position 311 and a top right position 321, or may be three points of a top left position 311, a top right position 321, and a bottom left position 331. In addition, a center position of a block and a bottom right position of a block may be used as control points, and it is also possible to use two or more points as control points.

According to an embodiment of the present disclosure, according to an equation having a motion vector corresponding to the control points as a parameter, motion prediction for each sub-block is performed by calculating a motion vector for each sub-block dividing a current block 300.

In addition, as a method of dividing a current block 300 into two or more sub-blocks, there is a method of dividing into square blocks in which N and M having a predefined fixed size or non-square blocks in which N and M are different from each other. Additionally, a method of transmitting a size of a sub-block using a higher-level syntax may also be used. In addition, a method of calculating a size of a sub-block using a motion vector corresponding to control points representing a current block 300 is also included.

Figure 6:
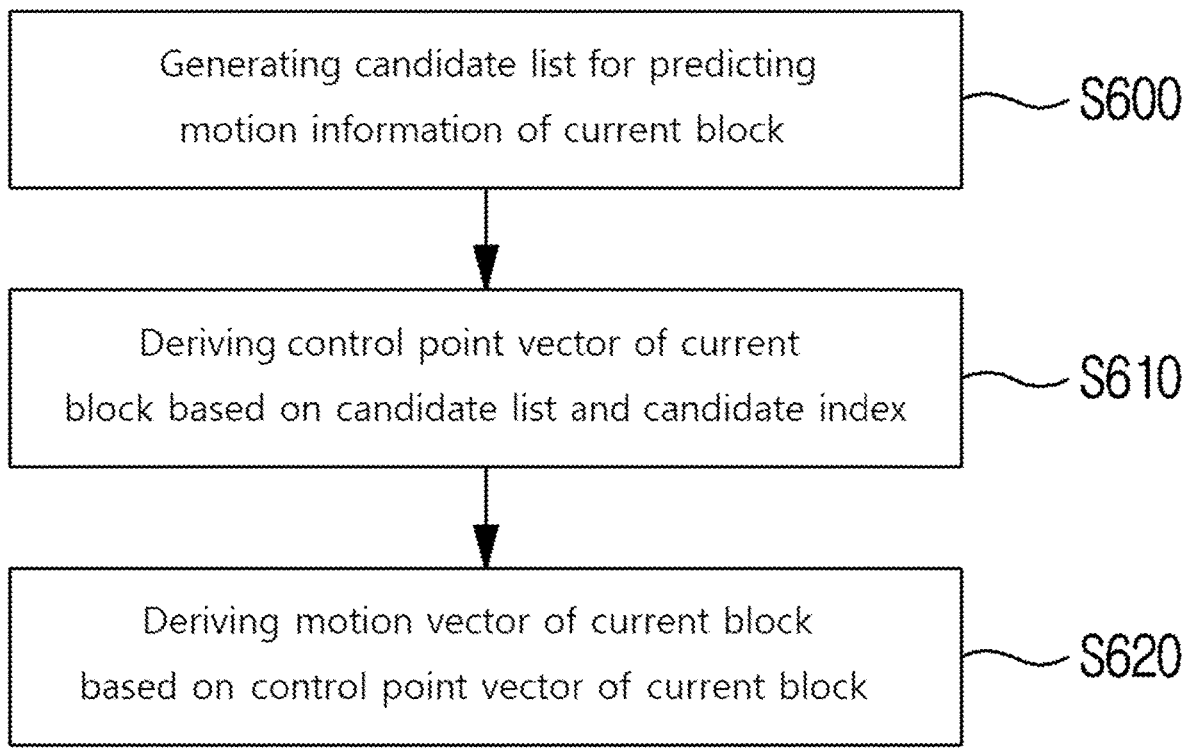
FIG. 6 illustrates an affine mode based inter prediction method as an embodiment to which the present disclosure is applied.

FIG. 6 illustrates an affine mode based inter prediction method as an embodiment to which the present disclosure is applied.

Referring to FIG. 6, a candidate list for predicting motion information of a current block may be generated (S600).

The candidate list may include one or more affine mode based candidates (hereinafter, referred to as affine candidates). An affine candidate may mean a candidate having a control point vector. A control point vector may mean a motion vector of a control point for an affine mode, and may be defined for a corner position of a block (e.g., at least one of a top left corner, a top right corner, a bottom left corner, or a bottom right corner).

An affine candidate may include at least one of a spatial candidate, a temporal candidate, or a configured candidate. Herein, the spatial candidate may be derived from a vector of a neighboring block spatially adjacent to a current block, and the temporal candidate may be derived from a vector of a neighboring block temporally adjacent to a current block. Herein, the neighboring block may mean a block encoded in an affine mode. The vector may mean a motion vector or a control point vector.

1. Spatial/Temporal Candidate Derivation Method

A width and a height of a current block 500 are cbW and cbH, respectively, and a position of a current block is (xCb, yCb). A width and a height of spatial neighboring blocks 510-550 are nbW and nbH, respectively, and a position of the spatial neighboring block are (xNb, yNb). A spatial neighboring block may include at least one of a left block 510, a bottom left block 540, a top right block 430, a top block 420, or a top left block 450 of a current block. Alternatively, the spatial neighboring block may further include at least one of a block adjacent to a right of the top left block 450 or a block adjacent to a bottom of the top left block 450.

A spatial candidate may have n control point vectors (cpMV). Herein, the n value may be an integer of 1, 2, 3, or more. The n value may be determined based on at least one of information on whether to be decoded in units of sub-blocks, information on whether a block is encoded in an affine mode, or information on a type (4-parameter or 6-parameter) of an affine mode.

For example, according to the information, when a corresponding block is decoded in units of sub-blocks or is a block encoded in an affine mode, the corresponding block may have two control point vectors. On the other hand, if not, the corresponding block may not perform affine mode based prediction.

Alternatively, according to the information, when a corresponding block is a block encoded in an affine mode, and a type of the affine mode is 6-parameter, the corresponding block may have 3 control point vectors. On the other hand, if not, the corresponding block may not perform affine mode based prediction.

The above-described information may be encoded and signaled by an encoding apparatus. Alternatively, all or part of the information may be derived from a decoding apparatus based on properties of a block. Herein, the block may mean a current block or a spatial/temporal neighboring block of a current block. The properties may mean a size, a shape, a position, a division type, an inter mode, a parameter related to a residual coefficient, and the like. The inter mode is a mode pre-defined in a decoding apparatus and may mean a merge mode, a skip mode, an AMVP mode, an affine mode, an intra/inter combination mode, an IBC mode, and the like. Alternatively, a value of n may be derived from a decoding apparatus based on the above-described block properties.

In this embodiment, n control point vectors may be expressed as a first control point vector (cpMV[0]), a second control point vector (cpMV[1]), a third control point vector (cpMV[2]), . . . an n-th control point vector (cpMV[n−1]).

As an example, a first control point vector (cpMV[0]), a second control point vector (cpMV[1]), a third control point vector (cpMV[2]), and a fourth control point vector (cpMV [3]) may be a vector corresponding to the positions of a top left sample, a top right sample, a bottom left sample, and a bottom right sample of a block, respectively. Herein, it is assumed that a spatial candidate have three control point vectors, and the three control point vectors may be arbitrary control point vectors selected from the first to n-th control point vectors. However, the present disclosure is not limited thereto, and a spatial candidate may have two control point vectors, and the two control point vectors may be arbitrary control point vectors selected from the first to n-th control point vectors.

A control point vector of a spatial candidate may be derived in consideration of whether a boundary of a current block contacts a CTU boundary.

(1) When a boundary of a current block does not contact a CTU boundary,

The first control point vector may be derived based on at least one of a first control point vector of a spatial neighboring block, a predetermined difference value, position information of a current block (xCb, yCb), or position information of a spatial neighboring block (xNb, yNb).

The number of difference values may be 1, 2, 3 or more. The number of the difference values may be variably determined in consideration of the properties of the above-described block, or may be a fixed value pre-promised to a decoding apparatus. The difference value may be defined as a difference value between one of a plurality of control point vectors and the other. For example, the difference value may include a first difference value between the second control point vector and the first control point vector, a second difference value between the third control point vector and the first control point vector, a third difference value between the fourth control point vector and the third control point vector, or a fourth difference value between the fourth control point vector and the second control point vector.

For example, the first control point vector may be derived as in Equation 1 below.

$cpMvLX[0][0]=(mvScaleHor+dHorX*$
$(xCb-xNb)+dHorY*(yCb-yNb))$ $cpMvLX[0][1]=(mvScaleVer+dVerX*(xCb-xNb)+$
$dVerY*(yCb-yNb))$ [Equation 1]

In Equation 1, the variables mvScaleHor and mvScaleVer may mean a first control point vector of a spatial neighboring block, or a value derived by applying a shift operation by k to the first control point vector. Herein, k may be an integer of 1, 2, 3, 4, 5, 6, 7, 8, 9 or more. The variables dHorX and dVerX correspond to x and y components of the first difference value between the second control point vector and the first control point vector, respectively. The variables dHorY and dVerY correspond to x and y components of the second difference value between the third control point vector and the first control point vector, respectively. The above-described variable may be derived as in Equation 2 below.

$mvScaleHor=CpMvLX[xNb][yNb][0][0]<<7$ $mvScaleVer=CpMvLX[xNb][yNb][0][1]<<7$ $dHorX=(CpMvLX[xNb+nNbW-1][yNb][1][0]-$
$CpMvLX[xNb][yNb][0][0])<<(7-\log 2NbW)$ $dVerX=(CpMvLX[xNb+nNbW-1][yNb][1][1]-$
$CpMvLX[xNb][yNb][0][1])<<(7-\log 2NbW)$ $dHorY=(CpMvLX[xNb][yNb+nNbH-1][2][0]-$
$CpMvLX[xNb][yNb][2][0])<<(7-\log 2NbH)$ $dVerY=(CpMvLX[xNb][yNb+nNbH-1][2][1]-$
$CpMvLX[xNb][yNb][2][1])<<(7-\log 2NbH)$ [Equation 2]

The second control point vector may be derived based on at least one of a first control point vector of a spatial neighboring block, a predetermined difference value, position information of a current block (xCb, yCb), a block size (width or height), or position information of a spatial neighboring block (xNb, yNb). Herein, the block size may mean a size of a current block and/or a spatial neighboring block. The difference value is as described in the first control point vector, and a detailed description thereof will be omitted. However, a range and/or number of difference values used in a process of deriving the second control point vector may be different from the first control point vector.

For example, the second control point vector may be derived as in Equation 3

$cpMvLX[1][0]=(mvScaleHor+dHorX*(xCb+cb-$
$Width-xNb)+dHorY*(yCb-yNb))$ $cpMvLX[1][1]=(mvScaleVer+dVerX*(xCb+cb-$
$Width-xNb)+dVerY*(yCb-yNb))$ [Equation 3]

In Equation 3, the variables mvScaleHor, mvScaleVer, dHorX, dVerX, dHorY, and dVerY are as described in Equation 1, and detailed descriptions thereof will be omitted.

The third control point vector may be derived based on at least one of a first control point vector of a spatial neighboring block, a predetermined difference value, position information of a current block (xCb, yCb), a block size (width or height), or position information of a spatial neighboring block (xNb, yNb). Herein, the block size may mean a size of a current block and/or a spatial neighboring block. The difference value is as described in the first control point vector, and a detailed description thereof will be omitted here. However, a range and/or number of difference values used in a process of deriving the third control point vector may be different from the first control point vector or the second control point vector.

For example, the third control point vector may be derived as in Equation 4 below.

$cpMvLX[2][0]=(mvScaleHor+dHorX*(xCb-xNb)+$
$dHorY*(yCb+cbHeight-yNb))$ $cpMvLX[2][1]=(mvScaleVer+dVerX*(xCb-xNb)+$
$dVerY*(yCb+cbHeight-yNb))$ [Equation 4]

In Equation 4, the variables mvScaleHor, mvScaleVer, dHorX, dVerX, dHorY, and dVerY are as described in Equation 1, and detailed descriptions thereof will be omitted. Meanwhile, through the above-described process, an n-th control point vector of a spatial candidate may be derived.

(2) When a boundary of a current block contacts a CTU boundary,

The first control point vector may be derived based on at least one of a motion vector (MV) of a spatial neighboring block, a predetermined difference value, position information of a current block (xCb, yCb), or position information of a spatial neighboring block (xNb, yNb).

The motion vector may be a motion vector of a sub-block located at a bottom of a spatial neighboring block. The sub-block may be located at the leftmost, center, or rightmost among a plurality of sub-blocks located at a bottom of a spatial neighboring block. Alternatively, the motion vector may mean an average value, a maximum value, or a minimum value of motion vectors of a sub-blocks.

The number of difference values may be 1, 2, 3 or more. The number of the difference values may be variably determined in consideration of the properties of the above-described block, or may be a fixed value pre-promised to a decoding apparatus. The difference value may be defined as a difference value between one of a plurality of motion vectors stored in a unit of a sub-block in a spatial neighboring block and the other. For example, the difference value may mean a difference value between a motion vector of a bottom right sub-block and a motion vector of a bottom left sub-block of a spatial neighboring block.

For example, the first control point vector may be derived as in Equation 5 below.

$$cpMvLX[0][0]=(mvScaleHor+dHorX*(xCb-xNb)+dHorY*(yCb-yNb))$$

$$cpMvLX[0][1]=(mvScaleVer+dVerX*(xCb-xNb)+dVerY*(yCb-yNb))$$ [Equation 5]

In Equation 5, the variables mvScaleHor and mvScaleVer may mean a motion vector (MV) of a spatial neighboring block described above or a value derived by applying a shift operation by k to the motion vector. Herein, k may be an integer of 1, 2, 3, 4, 5, 6, 7, 8, 9 or more.

The variables dHorX and dVerX correspond to x and y components of a predetermined difference value, respectively. Herein, the difference value means a difference value between a motion vector of a bottom right sub-block and a motion vector of a bottom left sub-block in a spatial neighboring block. The variables dHorY and dVerY may be derived based on the variables dHorX and dVerX. The above-described variable may be derived as in Equation 6 below.

$$mvScaleHor=MvLX[xNb][yNb+nNbH-1][0]<<7$$

$$mvScaleVer=MvLX[xNb][yNb+nNbH-1][1]<<7$$

$$dHorX=(MvLX[xNb+nNbW-1][yNb+nNbH-1][0]-MvLX[xNb][yNb+nNbH-1][0])<<(7-\log 2NbW)$$

$$dVerX=(MvLX[xNb+nNbW-1][yNb+nNbH-1][1]-MvLX[xNb][yNb+nNbH-1][1])<<(7-\log 2NbW)$$

$$dHorY=-dVerX$$

$$dVerY=dHorX$$ [Equation 6]

The second control point vector may be derived based on at least one of a motion vector (MV) of a spatial neighboring block, a predetermined difference value, position information of a current block (xCb, yCb), a block size (width or height), or position information of spatial neighboring block (xNb, yNb). Herein, the block size may mean a size of a current block and/or a spatial neighboring block. The motion vector and the difference value are as described in the first control point vector, and a detailed description thereof will be omitted. However, a position of a motion vector used in a process of deriving the second control point vector, a range and/or the number of difference values may be different from the first control point vector.

For example, the second control point vector may be derived as in Equation 7 below.

$$cpMvLX[1][0]=(mvScaleHor+dHorX*(xCb+cbWidth-xNb)+dHorY*(yCb-yNb))$$

$$cpMvLX[1][1]=(mvScaleVer+dVerX*(xCb+cbWidth-xNb)+dVerY*(yCb-yNb))$$ [Equation 7]

In Equation 7, the variables mvScaleHor, mvScaleVer, dHorX, dVerX, dHorY, and dVerY are as described in Equation 5, and detailed descriptions thereof will be omitted.

The third control point vector may be derived based on at least one of a motion vector (MV) of a spatial neighboring block, a predetermined difference value, position information of a current block (xCb, yCb), a block size (width or height), or position information of spatial neighboring block (xNb, yNb). Herein, the block size may mean a size of a current block and/or a spatial neighboring block. The motion vector and the difference value are as described in the first control point vector, and detailed descriptions thereof will be omitted. However, a position of a motion vector used in a process of deriving the third control point vector, a range and/or the number of difference values may be different from the first control point vector or the second control point vector.

For example, the third control point vector may be derived as in Equation 8 below $$cpMvLX[2][0]=(mvScaleHor+dHorX*(xCb-xNb)+dHorY*(yCb+cbHeight-yNb))$$

$$cpMvLX[2][1]=(mvScaleVer+dVerX*(xCb-xNb)+dVerY*(yCb+cbHeight-yNb))$$ [Equation 8]

In Equation 8, the variables mvScaleHor, mvScaleVer, dHorX, dVerX, dHorY, and dVerY are as described in Equation 5, and detailed descriptions thereof will be omitted. Meanwhile, through the above-described process, the n-th control point vector of a spatial candidate may be derived.

The above-described process of deriving the affine candidate may be performed for each pre-defined spatial neighboring block. The pre-defined spatial neighboring block may include at least one of a left block, a bottom left block, a top right block, a top block, or a top left block of a current block.

Alternatively, a process of deriving an affine candidate may be performed for each group of spatial neighboring blocks. Herein, the spatial neighboring blocks may be classified into a first group including a left block and a bottom left block, and a second group including a top right block, a top block, and a top left block.

For example, one affine candidate may be derived from spatial neighboring blocks belonging to the first group. The derivation may be performed until an available affine candidate is found based on a predetermined priority. The priority may be an order of a left block→a bottom left block, or the reverse order. According to the priority, it is determined whether a corresponding spatial neighboring block in the first group is a block decoded through affine mode based prediction, and a block decoded by the very first affine mode based prediction may be selected as an affine candidate.

Likewise, one affine candidate may be derived from a spatial neighboring block belonging to the second group.

The derivation may be performed until an available affine candidate is found based on a predetermined priority. The priority may be in an order of a top right block→a top block→a top left block, or the reverse order. According to the priority, it is determined whether a corresponding spatial neighboring block in the second group is a block decoded through affine mode based prediction, and a block decoded by the very first affine mode based prediction may be selected as an affine candidate.

The above-described embodiment may be applied in the same/similar manner to a temporal neighboring block. Herein, the temporal neighboring block may belong to a picture different from a current block, and may be a block at the same position as a current block. The block at the same position may be a block including a position of a top left sample, a center position, or a position of a sample adjacent to a bottom right sample of a current block.

Alternatively, a temporal neighboring block may mean a block at a position shifted by a predetermined disparity vector from the block at the same position. Herein, the disparity vector may be determined based on a motion vector of any one of the above-described spatial neighboring blocks of the current block.

2. A Method of Deriving a Configured Candidate

A configured candidate may be derived based on a combination between motion vectors of spatial/temporal neighboring blocks in a current block. A configured candidate may be derived based on a combination of at least two of control point vectors (hereinafter, referred to as control point vectors (cpMVCorner[n])) corresponding to each corner of a current block. Herein, the n may be 0, 1, 2, or 3.

The control point vector (cpMVCorner[n]) may be derived based on a motion vector of a spatial neighboring block and/or a temporal neighboring block. Herein, the spatial neighboring block may include at least one of a first neighboring block (A, B or C) adjacent to a top left sample of a current block, a second neighboring block (D or E) adjacent to a top right sample of the current block, or a third neighboring block (F or G) adjacent to a bottom left sample of the current block. The temporal neighboring block may be a block belonging to a picture different from the current block, and may mean a block at the same position as the current block (hereinafter, referred to as a fourth neighboring block Col). Herein, the fourth neighboring block may mean a block (H, I, or J) including a position of a top left sample, a top right sample, or a bottom left sample of the current block, or a block adjacent to a position of a bottom right sample of the current block.

The first neighboring block may mean a neighboring block at a top left (A), top (B), or left (C) of a current block. It is determined whether motion vectors of neighboring blocks A, B, and C are available according to a predetermined priority, and a control point vector may be determined using motion vectors of available neighboring blocks. The availability determination may be performed until a neighboring block having an available motion vector is found. Herein, the priority may be in an order of A→B→C. However, the present disclosure is not limited thereto, and may be in an order of A→C→B, C→A→B, or B→A→C.

The second neighboring block may mean a top neighboring block (D) or a top right neighboring block (E) of a current block. Likewise, whether motion vectors of neighboring blocks D and E are available may be determined according to a predetermined priority, and a control point vector may be determined by using motion vectors of available neighboring blocks. The availability determination may be performed until a neighboring block having an available motion vector is found. Herein, the priority may be in an order of D→E, or in an order of E→D.

The third neighboring block may mean a left neighboring block (F) or a bottom left neighboring block (G) of a current block. Likewise, whether a motion vector of a neighboring block is available may be determined according to a predetermined priority, and a control point vector may be determined by using the motion vector of the neighboring block that is available. The availability determination may be performed until a neighboring block having an available motion vector is found. Herein, the priority may be in an order of G→F, or in an order of F→G.

For example, a first control point vector (cpMVCorner[0]) may be set as a motion vector of a first neighboring block, a second control point vector (cpMVCorner[1]) may be set as a motion vector of a second neighboring block, and a third control point vector cpMVCorner[2] may be set as a motion vector of a third neighboring block. A fourth control point vector cpMVCorner[3] may be set as a motion vector of a fourth neighboring block.

Alternatively, a first control point vector may be derived using at least one motion vector of a first neighboring block or a fourth neighboring block, wherein the fourth neighboring block may be a block (H) including a position of a top left sample. A second control point vector may be derived using at least one motion vector of a second neighboring block or a fourth neighboring block, wherein the fourth neighboring block may be a block (I) including a position of a top right sample. A third control point vector may be derived using at least one motion vector of a third neighboring block or a fourth neighboring block, wherein the fourth neighboring block may be a block (J) including a position of a bottom left sample.

Alternatively, any one of first to fourth control point vectors may be derived based on the other. For example, a second control point vector may be derived by applying a predetermined offset vector to a first control point vector. The offset vector may be a difference vector between a third control point vector and a first control point vector, or may be derived by applying a predetermined scaling factor to the difference vector. The scaling factor may be determined based on at least one of a width or height of a current block and/or a neighboring block.

K configured candidates ConstK according to the present disclosure may be determined through a combination of at least two of first to fourth control point vectors described above. The K value may be an integer of 1, 2, 3, 4, 5, 6, 7 or more. The K value may be derived based on information signaled by an encoding apparatus or may be a value pre-promised to a decoding apparatus. The information may include information indicating the maximum number of configured candidates included in a candidate list.

Specifically, a first configured candidate Const1 may be derived by combining first to third control point vectors. For example, a first configured candidate Const1 may have a control point vector as shown in Table 1 below. Meanwhile, only when reference picture information of a first neighboring block is the same as reference picture information of second and third neighboring blocks, a control point vector may be configured as shown in Table 1. Herein, the reference picture information may mean a reference picture index indicating a position of a corresponding reference picture in a reference picture list, or a picture order count (POC) value indicating an output order.

TABLE 1

| Idx | Control point vector |
| --- | --- |
| 0 | cpMvCorner[ 0 ] |
| 1 | cpMvCorner[ 1 ] |
| 2 | cpMvCorner[ 2 ] |

A second configured candidate Const2 may be derived by combining first, second, and fourth control point vectors. For example, a second configured candidate Const2 may have a control point vector as shown in Table 2 below. Meanwhile, only when reference picture information of a first neighboring block is the same as reference picture information of second and fourth neighboring blocks, a control point vector may be configured as shown in Table 2. Herein, the reference picture information is as described above.

TABLE 2

| Idx | Control point vector |
| --- | --- |
| 0 | cpMvCorner[ 0 ] |
| 1 | cpMvCorner[ 1 ] |
| 2 | cpMvCorner[ 3 ] + cpMvCorner[ 1 ] − cpMvCorner[ 0 ] cpMvCorner[ 3 ] + cpMvCorner[ 0 ] − cpMvCorner[ 1 ] |

A third configured candidate Const3 may be derived by combining first, third, and fourth control point vectors. For example, a third configured candidate Const3 may have a control point vector as shown in Table 3 below. Meanwhile, only when reference picture information of a first neighboring block is the same as reference picture information of third and fourth neighboring blocks, a control point vector may be configured as shown in Table 3. Herein, the reference picture information is as described above.

TABLE 3

| Idx | Control point vector | Control point vector |
| --- | --- | --- |
| 0 | cpMvCorner[0] | cpMvCorner[0] |
| 1 | cpMvCorner[3] + cpMvCorner[0] − cpMvCorner[2] | cpMvCorner[2] |
| 2 | cpMvCorner[2] | cpMvCorner[0] + cpMvCorner[3] − cpMvCorner[2] |

A fourth configured candidate Const4 may be derived by combining second, third, and fourth control point vectors. For example, a fourth configured candidate Const4 may have a control point vector as shown in Table 4 below. Meanwhile, only when reference picture information of a second neighboring block is the same as reference picture information of third and fourth neighboring blocks, a control point vector may be configured as shown in Table 4. Herein, the reference picture information is as described above.

TABLE 4

| Idx | Control point vector | Control point vector |
| --- | --- | --- |
| 0 | cpMvCorner[1] + cpMvCorner[2] − cpMvCorner[3] | cpMvCorner[2] |
| 1 | cpMvCorner[1] | cpMvCorner[3] |
| 2 | cpMvCorner[2] | cpMvCorner[3] + cpMvCorner[2] − cpMvCorner[1] |

A fifth configured candidate Const5 may be derived by combining first and second control point vectors. For example, a fifth configured candidate Const5 may have a control point vector as shown in Table 5 below. Meanwhile, only when reference picture information of a first neighboring block is the same as reference picture information of a second neighboring block, a control point vector may be configured as shown in Table 5. Herein, the reference picture information is as described above.

TABLE 5

| Idx | Control point vector |
| --- | --- |
| 1 | cpMvCorner[ 0 ] |
| 2 | cpMvCorner[ 1 ] |

A sixth configured candidate Const6 may be derived by combining first and third control point vectors. For example, a sixth configured candidate Const6 may have a control point vector as shown in Table 6 below. Meanwhile, only when reference picture information of a first neighboring block is the same as reference picture information of a third neighboring block, a control point vector may be configured as shown in Table 6. Herein, the reference picture information is as described above.

TABLE 6

| Idx | Control point vector | Control point vector |
| --- | --- | --- |
| 1 | cpMvCorner[ 0 ] | cpMvCorner[ 0 ] |
| 2 | cpMvCorner[ 2 ] | cpMvCorner[ 1 ] |

In Table 6, cpMvCorner[1] may be a second control point vector derived based on first and third control point vectors. The second control point vector may be derived based on at least one of a first control point vector, a predetermined difference value, or a size of a current/neighboring block. For example, a second control point vector may be derived as in Equation 9 below.

$$cpMvCorner[1][0]=(cpMvCorner[0][0]<<7)+ ((cpMvCorner[2][1]-cpMvCorner[0][1])<<(7+ \text{Log } 2(cbHeight/cbWidth)))$$

$$cpMvCorner[1][1]=(cpMvCorner[0][1]<<7)\leq ((cpMvCorner[2][0]-cpMvCorner[0][0])<<(7+ \text{Log } 2(cbHeight/cbWidth))) \quad \text{[Equation 9]}$$

In the above-described K configured candidates (ConstK), the K value does not limit a position or priority of a configured candidate arranged in the candidate list.

In addition, all of first to sixth configured candidates may be included in a candidate list, or only some of the first to sixth configured candidates may be included in the candidate list.

For example, when it is determined that a current block uses three control point vectors, only configured candidates generated through a combination of three of first to fourth control point vectors may be used. When it is determined that a current block uses two control point vectors, a configured candidate generated through a combination of at least two of first to fourth control point vectors may be used, or a configured candidate generated through only a combination of two of first to fourth control point vectors may be used.

Alternatively, only partially configured candidates may be included in a candidate list in consideration of the maximum number of affine candidates included in the candidate list. Herein, the maximum number may be determined based on information on the maximum number signaled by an encoding apparatus, or may be variably determined in consideration of the above-described properties of the current block. In this case, K value of a configured candidate (ConstK) may mean a priority to be inserted into a candidate list.

Meanwhile, when a difference value between two control point vectors belonging to the configured candidate is less than a predetermined threshold value, the configured candidate may not be inserted into a candidate list. The difference value between the two control point vectors may be divided into a difference value in a horizontal direction and a difference value in a vertical direction. Herein, the difference value in the horizontal direction may mean a difference value between a first control point vector 610 and a second control point vector 620, and the difference value in the vertical direction may mean a difference value between a first control point vector 610 and a third control point vector 630. The threshold value may mean 0 or a vector having a size pre-promised to an encoding/decoding apparatus.

The plurality of the affine candidates described above may be arranged in the candidate list based on a predetermined priority. For example, a plurality of affine candidates may be arranged in a candidate list in an order of a spatial candidate, a temporal candidate, and a configured candidate. Alternatively, a plurality of affine candidates may be arranged in a candidate list in an order of a temporal candidate, a spatial candidate, and a configured candidate. However, the present disclosure is not limited thereto, and a temporal candidate may be arranged after a configured candidate. Alternatively, some of configured candidates may be arranged before a spatial candidate, and the rest may be arranged after the spatial candidate.

Referring to FIG. 6, a control point vector of a current block may be derived based on a candidate list and a candidate index (S610).

A candidate index may mean an index that is coded to derive a control point vector of a current block. The candidate index may specify any one of a plurality of affine candidates included in a candidate list. A control point vector of a current block may be derived by using a control point vector of an affine candidate specified by the candidate index.

For example, it is assumed that a type of an affine mode of a current block is 4-parameter (i.e., it is determined that the current block uses two control point vectors). In this case, when an affine candidate specified by the candidate index has three control point vectors, among the three control point vectors, only two control point vectors (e.g., control point vectors with Idx=0, 1) may be selected and set as control point vectors of a current block. Alternatively, the three control point vectors of a specified affine candidate may be set as control point vectors of a current block. In this case, a type of an affine mode of a current block may be updated to 6-parameter.

Conversely, it is assumed that a type of an affine mode of a current block is 6-parameter (i.e., it is determined that the current block uses 3 control point vectors). In this case, when an affine candidate specified by the candidate index has two control point vectors, one additional control point vector may be generated, and the two control point vectors of the affine candidate and the additional control point vector may be used as control point vectors of the current block. The additional control point vector may be derived based on at least one of two control point vectors of an affine candidate, a size of a current/neighboring block, or position information.

Alternatively, two control point vectors of the specified affine candidate may be set as control point vectors of a current block. In this case, a type of an affine mode of a current block may be updated to 4-parameter.

Referring to FIG. 6, a motion vector of a current block may be derived based on a control point vector of a current block (S620).

The motion vector may be derived in units of sub-blocks of a current block. To this end, the current block may be divided into a plurality of N×M sub-blocks. Herein, the N×M sub-block may be in a shape of a non-square (N>M or N<M) or a square (N=M). The values of N and M may be 4, 8, 16, 32 or more.

In consideration of consumption of a memory bandwidth, a motion vector may be derived for each sub-block in a current block, or one motion vector may be derived for the current block. This selective derivation may be performed in consideration of at least one of whether a current block performs bidirectional prediction (PRED_BI) or a size of a predetermined reference region (refSize). Herein, the reference region may mean a region referenced for motion compensation of one or more sub-blocks. The reference region may include a reference block specified by a motion vector of one or more sub-blocks and/or a pixel used to interpolate a minority pel of a reference block. A size of the reference area may be expressed by any one of a width or a height of the reference area, the maximum/minimum value of the width and the height, a product of the width and the height, a sum of the width and the height, and the like.

For example, when a current block performs bidirectional prediction, and a size of a reference region for n sub-blocks is less than or equal to a predetermined first threshold value (condition 1), a motion vector may be derived for each sub-block in a current block.

Alternatively, when a current block performs unidirectional prediction, and a size of a reference region for m sub-blocks is less than or equal to a predetermined second threshold value (condition 2), a motion vector may be derived for each sub-block in a current block.

Then and m values may be 1, 2, 3, 4, 5 or more. The values of n and m may be limited to even numbers. n may be set to a value larger than m. For example, n may be set to 4 and m may be set to 2.

The first threshold value may be determined as $(15+i)\times(15+j)$, and the second threshold value may be determined as $(15+i)\times(11+j)$ or $(11+i)\times(15+j)$. Herein, i and j may be natural numbers greater than or equal to 0. For example, when i and j are 0, the first threshold value and the second threshold value may be determined as 225 and 165, respectively.

A size of the reference region may be determined using at least one of a scaling value (mvScaleHor, mvScaleVer), a first difference value (dHorX, dVerX), or a second difference value (dHorY, dVerY). A method of deriving the scaling value, the first difference value, and the second difference value is as described above, and a detailed description thereof will be omitted.

A size of the reference region is determined for n or m sub-blocks, respectively, and may be determined as in Equation 10 below in consideration of an arrangement of n or m sub-blocks.

$$maxW4=Max(0, Max(4*(2048+dHorX), Max(4*dHorY, 4*(2048+dHorX)+4*dHorY)))$$

$$minW4=Min(0, Min(4*(2048+dHorX), Min(4*dHorY, 4*(2048+dHorX)+4*dHorY)))$$

$$maxH4=Max(0, Max(4*dVerX, Max(4*(2048+dVerY), 4*dVerX+4*(2048+dVerY))))$$

$$\text{min}H4=\text{Min}(0, \text{Min}(4*dVerX, \text{Min}(4*(2048+dVerY), 4*dVerX+4*(2048+dVerY))))$$

$$bxWX4=((\text{max}W4-\text{min}W4)>>11)+9$$

$$bxHX4=((\text{max}H4-\text{min}H4)>>11)+9$$

$$bxWXh=((\text{Max}(0, 4*(2048+dHorX))-\text{Min}(0, 4*(2048+dHorX)))>>11)+9$$

$$bxHXh=((\text{Max}(0, 4*dVerX)-\text{Min}(0, 4*dVerX))>>11)+9$$

$$bxWXv=((\text{Max}(0, 4*dHorY)-\text{Min}(0, 4*dHorY))>>11)+9$$

$$bxHXv=((\text{Max}(0, 4*(2048+dVerY))-\text{Min}(0, 4*(2048+dVerY)))>>11)+9 \quad [\text{Equation 10}]$$

In Equation 10, bxWX4 and bxHX4 may mean a width and a height of a reference region for four sub-blocks, respectively. The four sub-blocks may be arranged in a 2×2 form. However, the present disclosure is not limited thereto, and they may be arranged in a 1×4 or 4×1 form. bxWX4 and bxHX4 may be derived using a first difference value (dHorX and dVerX) and a second difference value (dHorY and dVerY).

Meanwhile, bxWXh and bxHXh may mean a width and a height of a reference area for two sub-blocks, respectively. The two sub-blocks may be arranged in a 2×1 form (arranged in a horizontal direction). The bxWXh and the bxHXh may be derived using only a first difference value (dHorX and dVerX). bxWXv and bxHXv may mean a width and a height of a reference region for two sub-blocks, respectively. The two sub-blocks may be arranged in a 1×2 form (arranged in a vertical direction). The bxWXv and the bxHXv may be derived using only a second difference values (dHorY and dVerY).

However, in the case of bidirectional prediction, a size of a reference region is determined based on n sub-blocks, and in this case, the n value is not limited to 4, and a sub-block may be a square in a 3×3 or 4×4 form, or a non-square in a 2×3 or 3×2 form. In addition, in the case of unidirectional prediction, a size of a reference region is determined based on m sub-blocks, and in this case, the m value is not limited to 2, and a sub-block may be a square in a 2×2 or 3×3 form, or a non-square in a 1×4 or 2×4 form. In addition, in the case of unidirectional prediction, a size of a reference region is determined based on m sub-blocks, and in this case, the m value is not limited to 2, and a sub-block may be a square in a 2×2 or 3×3 form, or a non-square in a 1×4 or 2×4 form.

If the above-described condition 1 or condition 2 is not satisfied, one motion vector may be derived for a current block. That is, all sub-blocks belonging to a current block may share one and the same motion vector, thereby reducing memory bandwidth consumption.

Based on a control point vector of a current block, an affine motion parameter may be calculated, and a motion vector of the current block may be derived based on the calculated affine motion parameter. Herein, the affine motion parameter may include at least one of the above-described scaling value, the above-described first difference value, or the above-described second difference value.

Figure 7:
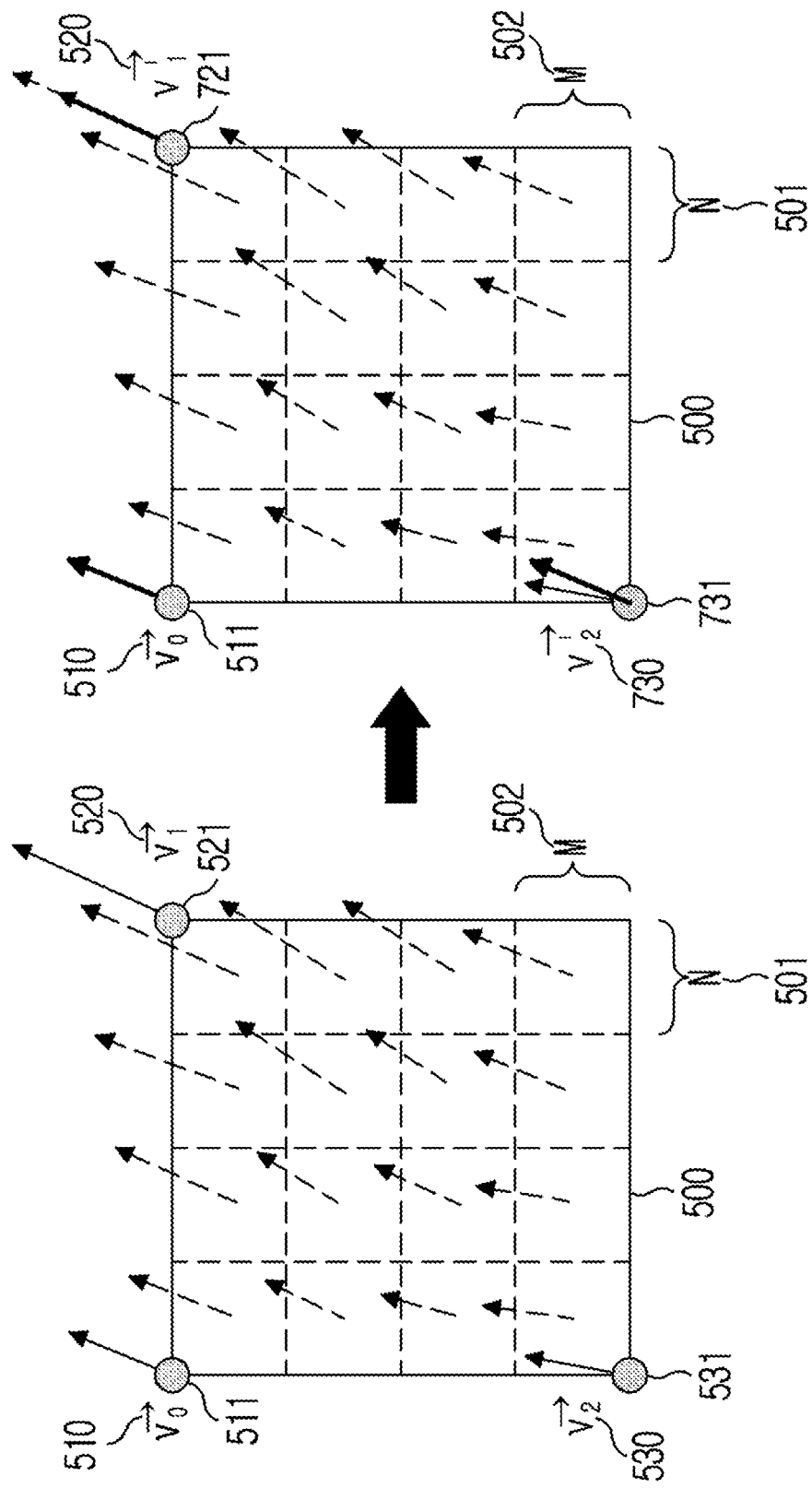
FIG. 7 illustrates a concept of limiting a motion vector in consideration of a memory bandwidth as an embodiment to which the present disclosure is applied.

FIG. 7 illustrates a concept of limiting a motion vector in consideration of a memory bandwidth as an embodiment to which the present disclosure is applied.

When one current block has a plurality of motion vectors, based on one or more reference motion vectors, properties of remaining motion vectors may be limited. The reference motion vector means a motion vector corresponding to a top left control point. However, the present disclosure is not limited thereto, and the reference motion vector may be defined as a motion vector corresponding to a bottom left or top right control point. Through this, it is possible to reduce a memory bandwidth for performing motion prediction and compensation. Herein, properties of a motion vector may include at least one of a direction, a size, a number, or a position of the motion vector. Through the above limitation, remaining motion vectors may be set as vectors having the same or similar direction and size as a reference motion vector. That is, when it is determined that excessive memory bandwidth is consumed due to a use of motion vectors in units of sub-blocks, a plurality of sub-blocks belonging to a current block may be set to share/use one motion vector.

In FIG. 5, an embodiment in which a motion vector for each sub-block is calculated by dividing one block into two or more sub-blocks, selecting two or more control points representing one block, and using motion vectors corresponding to corresponding control points is illustrated.

In addition, FIG. 7 shows a concept of limiting remaining motion vectors based on a first motion vector among motion vectors corresponding to two or more control points 311, 321, 331 representing a current block 300.

As shown in FIG. 7, according to an embodiment of the present disclosure, when there are motion vectors 310, 320, 330 corresponding to three control points 311, 321, 331 of a current block 300, information such as a direction and size of a second motion vector 320 and/or a third motion vector 330 may be changed to be the same/similar to a first motion vector by using information such as a direction and size of the first motion vector 310. The change of the motion vector refers to clipping or calculating a motion vector to specific values to change a value of the motion vector.

In this case, in the case of using a method of limiting remaining motion vectors by using a first motion vector, a step of recalculating a size and direction of all or part of the remaining motion vectors may be additionally included using a size and direction of the first motion vector.

Limiting remaining motion vectors by using a first motion vector may mean changing a size and direction of a second motion vector and/or a third motion vector to refer to a position within a predetermined area specified by the first motion vector.

FIG. 7 shows an example in which a second motion vector 320 and a third motion vector 330 are changed according to a size and direction of a first motion vector 310.

Figure 8:
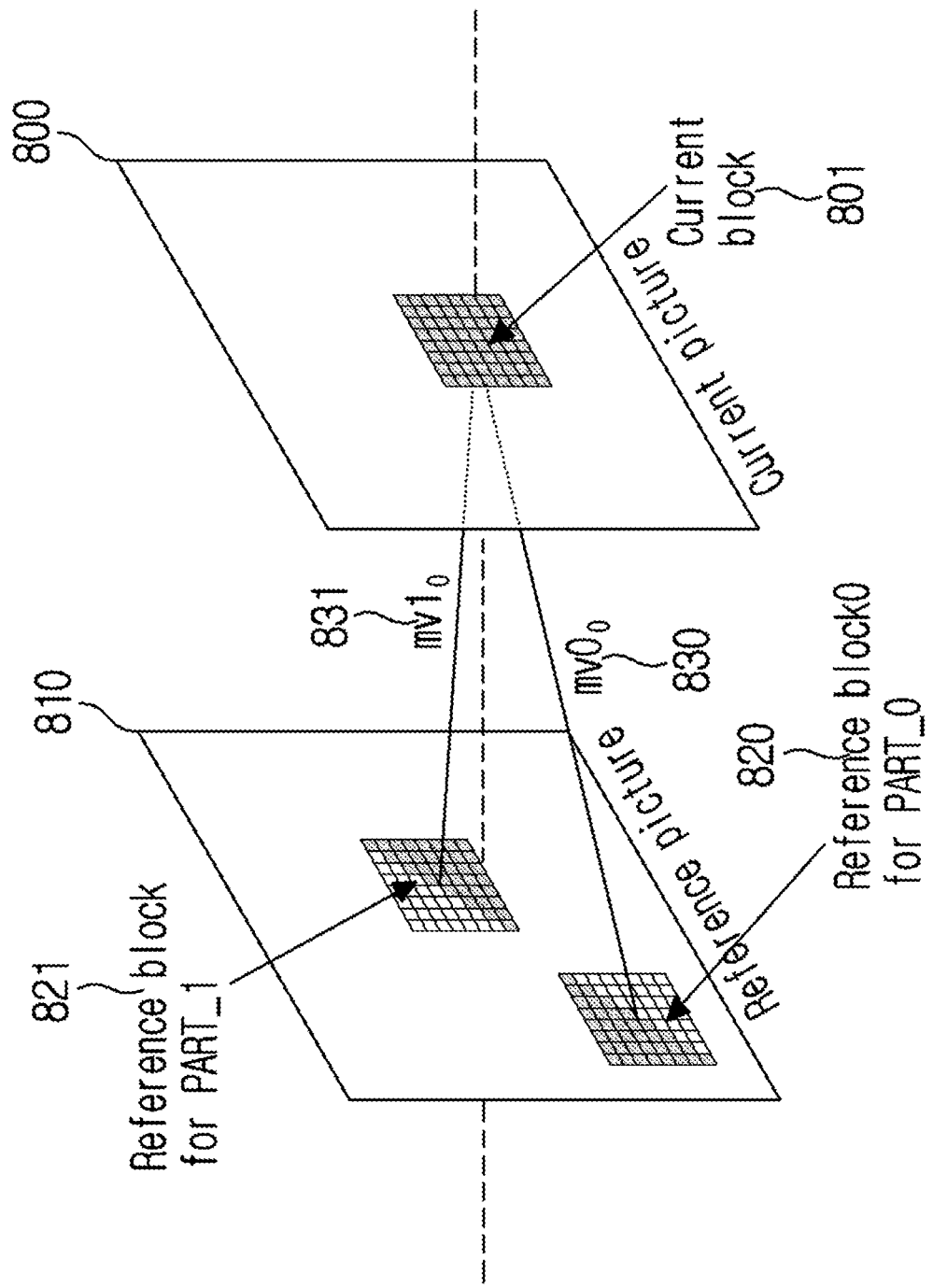
FIG. 8 illustrates an inter prediction method using mask-based prediction in a video coding method and apparatus according to an embodiment of the present disclosure.

FIG. 8 illustrates an inter prediction method using mask-based prediction in a video coding method and apparatus according to an embodiment of the present disclosure.

A method of limiting a second motion vector and other motion vectors using a first motion vector may also be applied to inter prediction using mask-based prediction shown in FIG. 8.

FIG. 8 shows a concept of mask-based motion prediction and compensation proposed in the present disclosure. In the mask-based motion prediction and compensation proposed in the present disclosure, motion prediction and compensation are performed by applying a mask to reference blocks at two or more different positions for one block.

In FIG. 8, a method of obtaining a pixel from a reference block 820 referred to by using a motion vector 830 for some pixels of a current block 801 in a picture 800 currently performing encoding and/or decoding, and obtaining a pixel from a reference block 821 referred to by using a motion vector 831 for other pixels of the current block. In this case, in the process of obtaining some pixels of the current block, a method of referencing target pixels in the form of applying a weight to a pixel value at the same position of a corresponding reference block may be used.

Figure 9:
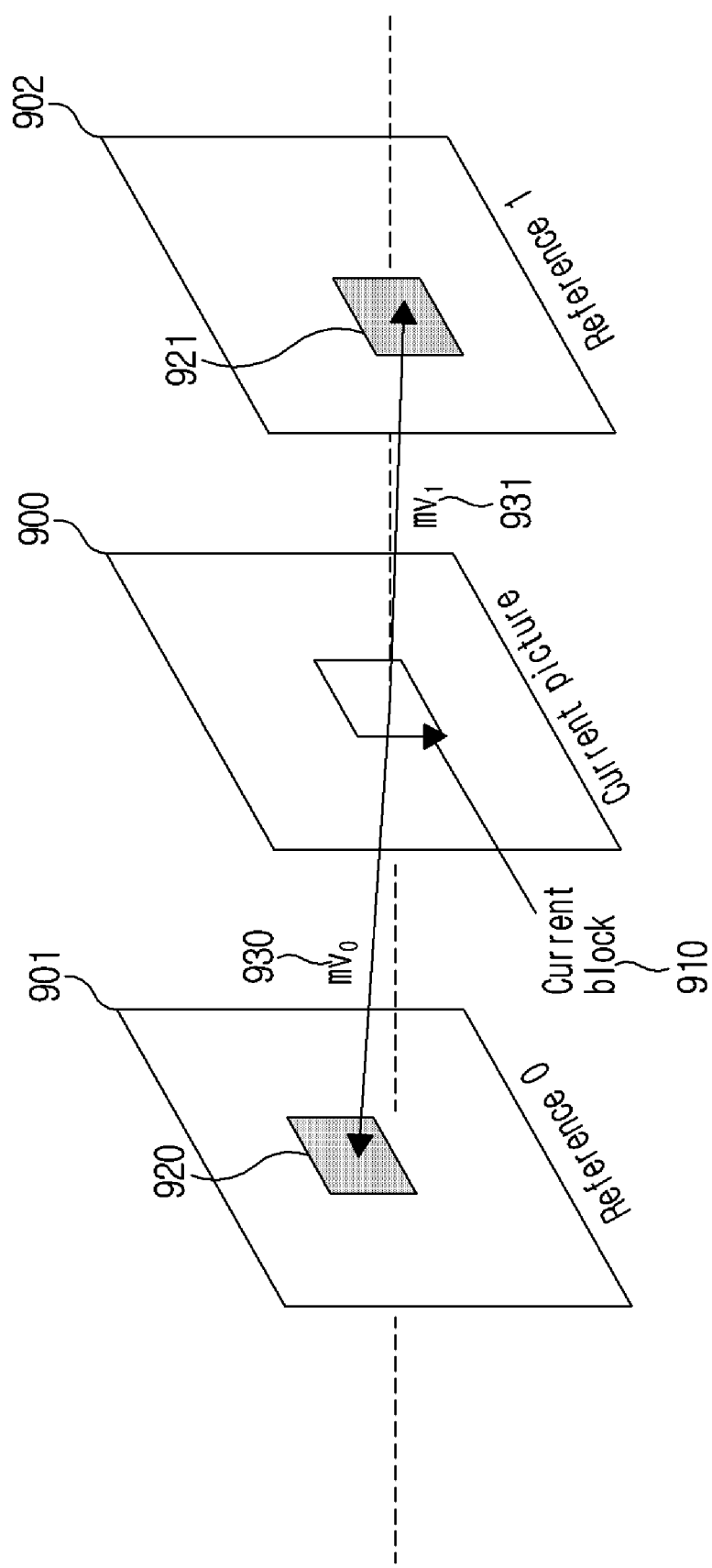
FIG. 9 illustrates a concept of bidirectional prediction in a video encoding and/or decoding method and apparatus according to an embodiment of the present disclosure.

FIG. 9 illustrates a concept of bidirectional prediction in a video encoding and/or decoding method and apparatus according to an embodiment of the present disclosure.

In FIG. 9 showing bidirectional prediction in a video encoding and decoding method and/or apparatus, in encoding and/or decoding a current block 910 existing in a current picture 900, a method of performing prediction using two or more reference blocks is referred to as bidirectional prediction.

In this case, the two or more reference blocks may be a block included in reference pictures 901 and 902 that have been temporally encoded and/or decoded prior to a current picture, or a block included in a region in which encoding and/or decoding is performed before a current block in a current picture.

In addition, one reference block may be a block included in a temporally adjacent picture, and the other reference block may be a block included in a region in which encoding and/or decoding is performed prior to a current block in a current picture.

As shown in FIG. 9, in performing bidirectional prediction for a current block 910, a prediction block of the current block 910 may be generated using different motion vectors mv0 (930), mv1 (931), or reference blocks 920 and 921 at positions derived using two or more motion vectors.

In this case, the motion vector comprehensively refers to information indicating a relative position of a reference block in a 2D coordinate plane with respect to a current block 910.

In addition, two or more motion vectors may be used.

Figure 10:
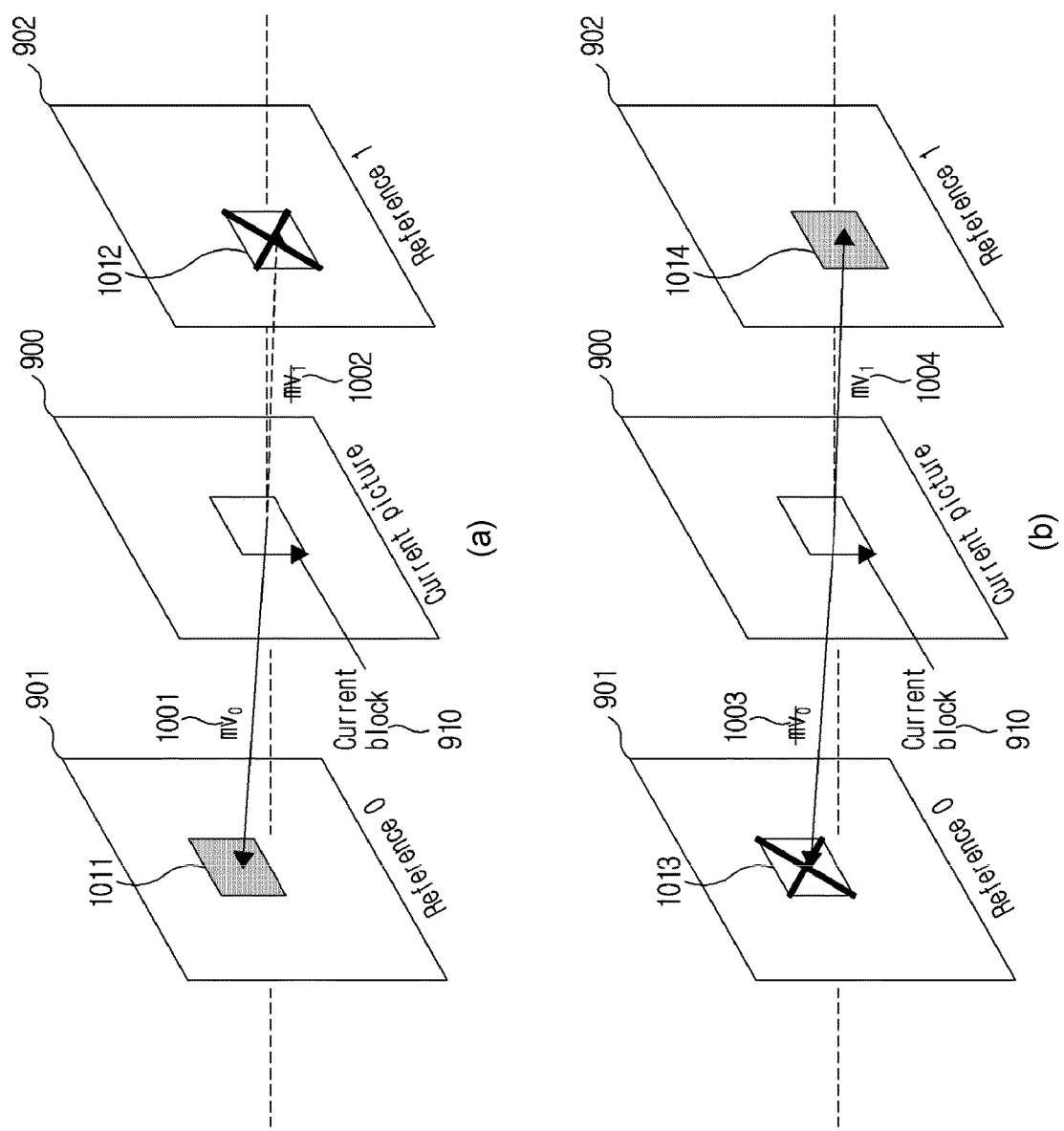
FIG. 10 illustrates a concept of limited bidirectional prediction as an embodiment to which the present disclosure is applied.

FIG. 10 illustrates a concept of limited bidirectional prediction as an embodiment to which the present disclosure is applied.

In FIG. 10A showing a concept in which prediction for a L1 direction is limited in bidirectional prediction, in encoding and/or decoding a current block 910 existing in a current picture 900, a method of forcibly performing unidirectional prediction in one direction according to a specific condition is referred to as limited bidirectional prediction.

In this case, according to an embodiment of the present disclosure, in the forcibly performing unidirectional prediction for one direction, an additional step of determining a predefined specific condition may be included.

The predefined specific condition may mean a size of a block and a condition for whether to use motion prediction in units of sub-blocks of a corresponding block.

In addition, the predefined specific condition may indicate not only a size of a block and a condition for whether to use motion prediction in units of sub-blocks of a corresponding block, but also a condition for whether to use block division motion prediction that divides one block into a plurality of blocks such as affine motion prediction and diagonal block division. A use of motion prediction in units of sub-blocks may be interpreted in the same meaning as affine motion prediction.

In addition, the size of the block among the predefined specific conditions may mean a size of a block expressed as a sum of a width of the block and a height of the block, or a product of a width of the block and a height of the block, and it may be predefined or transmitted to a decoder through higher-level syntax.

In this case, the size of the block, with respect to a sum of a width of the block and a height of the block, may be 12 derived from (8+4) or (4+8), or may be 16 derived from (8+8). In addition, the size of the block may be 32 derived from (4×8) or (8×4), or may be 64 derived from (8×8) with respect to a product of a width of the block and a height of the block.

When using limited bidirectional prediction according to an embodiment of the present disclosure, even when a motion vector predictor (MVP) of a current block 910 is bidirectional prediction, a step of forcibly adjusting motion vector information to perform unidirectional prediction may be additionally included.

In an embodiment of the present disclosure shown in FIG. 10A, with respect to a current block 910, an example of limiting reference to the reference picture 902 in a L1 direction and limiting a reference motion vector mv1 1002 and a reference block 1012 in the L1 direction is illustrated. In this case, it additionally includes a step of forcibly initializing a reference motion vector mv1 (1002) in a L1 direction to a (0,0) vector, initializing a reference picture index in a L1 direction, and changing a prediction direction of a current block 910 to mean L0 during unidirectional prediction.

FIG. 10B shows a concept in which prediction for a L0 direction is limited in bidirectional prediction according to an embodiment of the present disclosure.

In FIG. 10B showing a concept in which prediction for a L0 direction is limited in bidirectional prediction, in encoding and/or decoding a current block 910 existing in a current picture 900, a method of forcibly performing unidirectional prediction for one direction under a specific condition is called limited bidirectional prediction.

In this case, according to an embodiment of a present disclosure, in forcibly performing unidirectional prediction for one direction, an additional step of determining a predetermined specific condition may be included.

The predefined specific condition may mean a size of a block and a condition for whether to use motion prediction in units of sub-blocks of a corresponding block.

In addition, the predefined specific condition may indicate not only a size of a block a condition for whether to use motion prediction in units of sub-blocks of a corresponding block, but also a condition for whether to use block division motion prediction that divides one block into a plurality of blocks such as affine motion prediction and diagonal block division. A use of motion prediction in units of sub-blocks may be interpreted in the same meaning as affine motion prediction.

When using limited bidirectional prediction according to an embodiment of the present disclosure, even when a motion vector predictor (MVP) of a current block 910 is bidirectional prediction, a step of forcibly adjusting motion vector information to perform unidirectional prediction may be additionally included.

In the embodiment of the present disclosure shown in FIG. 10B, an example of limiting a reference motion vector mv0 1003 and a reference block 1013 in a L0 direction by limiting reference to a reference picture 901 in a L0 direction with respect a current block 910 is shown. In this case, it additionally includes a step of forcibly initializing a reference motion vector mv0 (1003) in a L0 direction to a (0,0) vector, initializing a reference picture index in a L0 direction, and changing a prediction direction of a current block 910 to mean L1 during unidirectional prediction.

Figure 11:
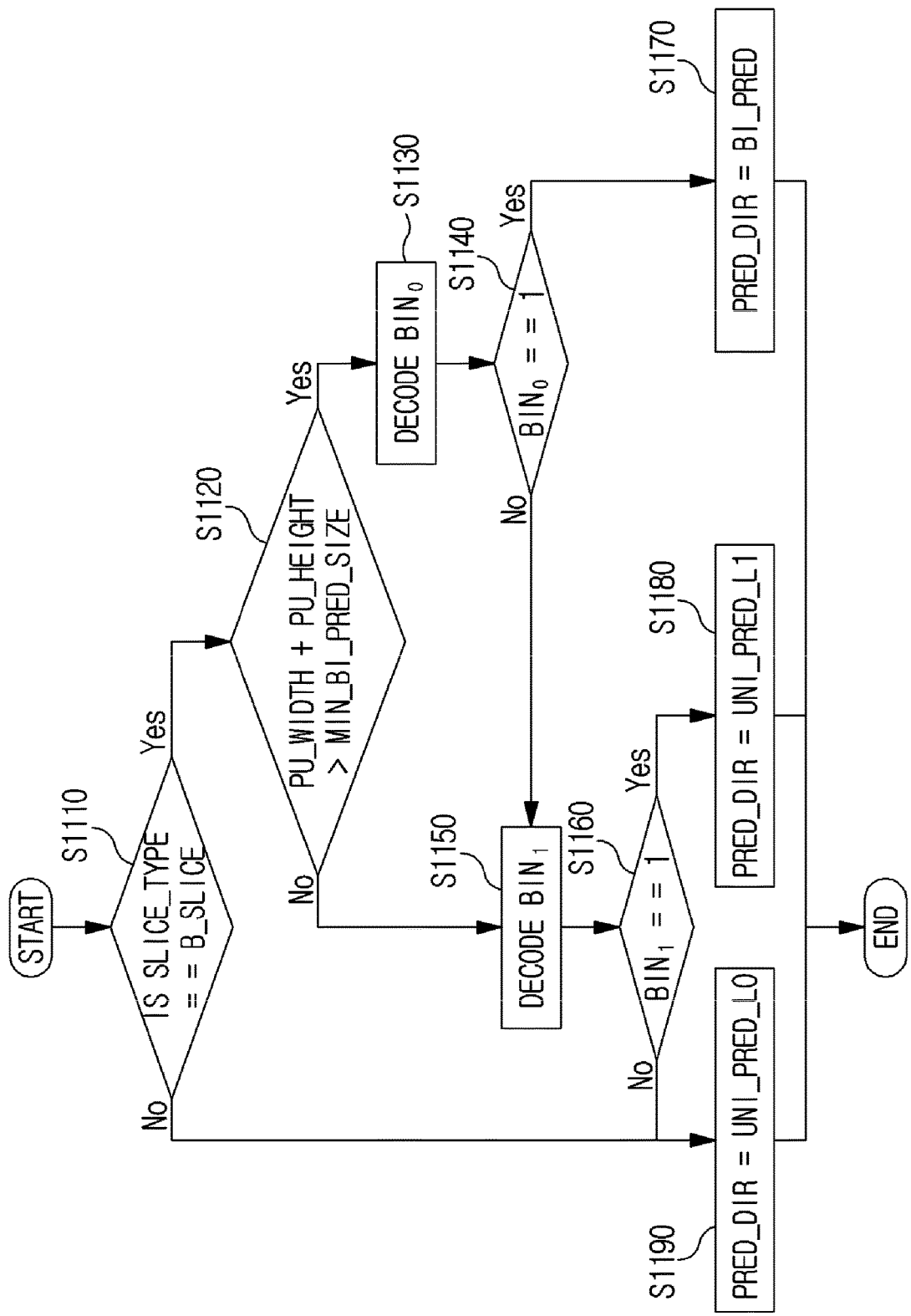
FIG. 11 is a flowchart of a process of a decoding prediction directionality according to an embodiment of the present disclosure.

FIG. 11 is a flowchart of a process of decoding a prediction directionality according to an embodiment of the present disclosure.

FIG. 11 shows a flowchart of a process of decoding a prediction directionality of a current block, and it may be used in a motion prediction mode for decoding the prediction directionality of the current block.

According to the embodiment shown in FIG. 11, a process of decoding a prediction directionality may include at least one of determining whether a current slice type is a slice allowing bidirectional prediction (S1110) or determining whether a current block is a block allowing bidirectional prediction (S1120). In addition, it may be further included at least one of a step of parsing a first bin of the prediction directionality (S1130) in the case that a current block is a block that allows bidirectional prediction, or a step of parsing a second bin of the prediction directionality (S1150) in the case that a size of a current block is not a size of a block allowing bidirectional prediction or the first bin is 0.

In addition, it may be further included at least one of a step of setting a current prediction directionality as a bidirectional prediction direction (S1170), a step of setting a current prediction directionality as a unidirectional prediction direction in a L1 direction (S1180), or a step of setting a current prediction directionality as a unidirectional prediction direction in a L0 direction (S1190).

In determining whether the current slice type is a slice type allowing bidirectional prediction (S1110), it is determined whether bidirectional prediction is allowed by checking the current slice type.

In this case, a slice type that allows the bidirectional prediction may be a B slice. In addition, in a prediction method using a pre-decoded region of a current picture as a reference picture, the slice type may be various.

A step of determining whether a current block is a block allowing bidirectional prediction (S1120) may mean an additional step of determining a specific condition for a current block, wherein the specific condition may mean a size of a block. In addition, it may be additionally included one or more of conditions for whether to use sub-block unit motion prediction of a corresponding block, and whether to use block division motion prediction that divides one block into a plurality of blocks, such as affine motion prediction and diagonal block division.

In the embodiment shown in FIG. 11, in a step of determining whether a current block is a block allowing bidirectional prediction (S1120), a case of determining bidirectional prediction using a size of the current block was used as an example, and it is determined whether the size of the current block is a size of a block that allows bidirectional prediction, which is predefined or transmitted in higher-level syntax.

In this case, the size of the block that allows bidirectional prediction, which is predefined or transmitted in higher-level syntax, may be expressed as a sum of a width of the block and a height of the block, or a product of a width of the block and a height of the block.

In this case, the size of the block may be 12 derived from (8+4) or (4+8), or may be 16 derived from (8+8) with respect to a sum of a width of the block and a height of the block. In addition, the size of the block may be 32 derived from (4×8) or (8×4), or may be 64 derived from (8×8) with respect to a product of a width of the block and a height of the block.

When the size of the current block is a size of a block that allows bidirectional prediction, a step of parsing a first bin for a prediction directionality (S1130) and subsequent steps are performed, and when the size of the current block is not the size of a block that allows bidirectional prediction, instead of performing the step of parsing the first bin for the prediction directionality (S1130) and a step of determining a value of the first bin (S1140), a step of parsing a second bin for a prediction directionality (S1150) is performed.

In the step of determining the value of the first bin for the prediction directionality (S1140), when the value of the first bin for the prediction directionality means 1, in a step of setting a prediction directionality of a current block as bidirectional prediction (S1170), a current prediction directionality is set to bidirectional direction.

When the size of the current block is not a size of a block that allows bidirectional prediction, or when the value of the first bin for the prediction directionality is 0, a step of parsing a second bin for the prediction directionality (S1150) is performed. In addition, in the step of determining the value of the second bin for the corresponding prediction directionality (S1160), when the value of the second bin for the prediction directionality means 1, in a step of setting the prediction directionality of the current block to unidirectional prediction in a L1 direction (S1180), the current directionality direction is set as unidirectional prediction in the L1 direction, and when the value of the second bin for the prediction directionality means 0, in a step of setting the prediction directionality of the current block as unidirectional prediction in a L0 direction (S1190), the current prediction directionality is set as unidirectional prediction in the L0 direction.

Table 7 may be an example of a size of a block in which the size of the current block allows bidirectional prediction. As shown in Table 7, when a block is divided using various block structures, when a sum of a width and a height of a block is less than or equal to a specific value, bidirectional prediction is not used, and only when the sum of the width and the height of the block is greater than the specific value, a limit may be set so that bidirectional prediction can be used. Table 7 shows an example in which the specific value is defined as 12. The specific value may use a predefined value, or may be signaled in one or more of a sequence parameter set (SPS), a picture parameter set (PPS), and a slice header, which are higher-level syntax.

TABLE 7

| | Name of inter_pred_idc | |
|---|---|---|
| inter_pred idc | (cbWidth + cbHeight) > 12 | (cbWidth + cbHeight) <= 12 |
| 0 | PRED_L0 | PRED_L0 |
| 1 | PRED_L1 | PRED_L1 |
| 2 | PRED_BI | — |

Figure 12:
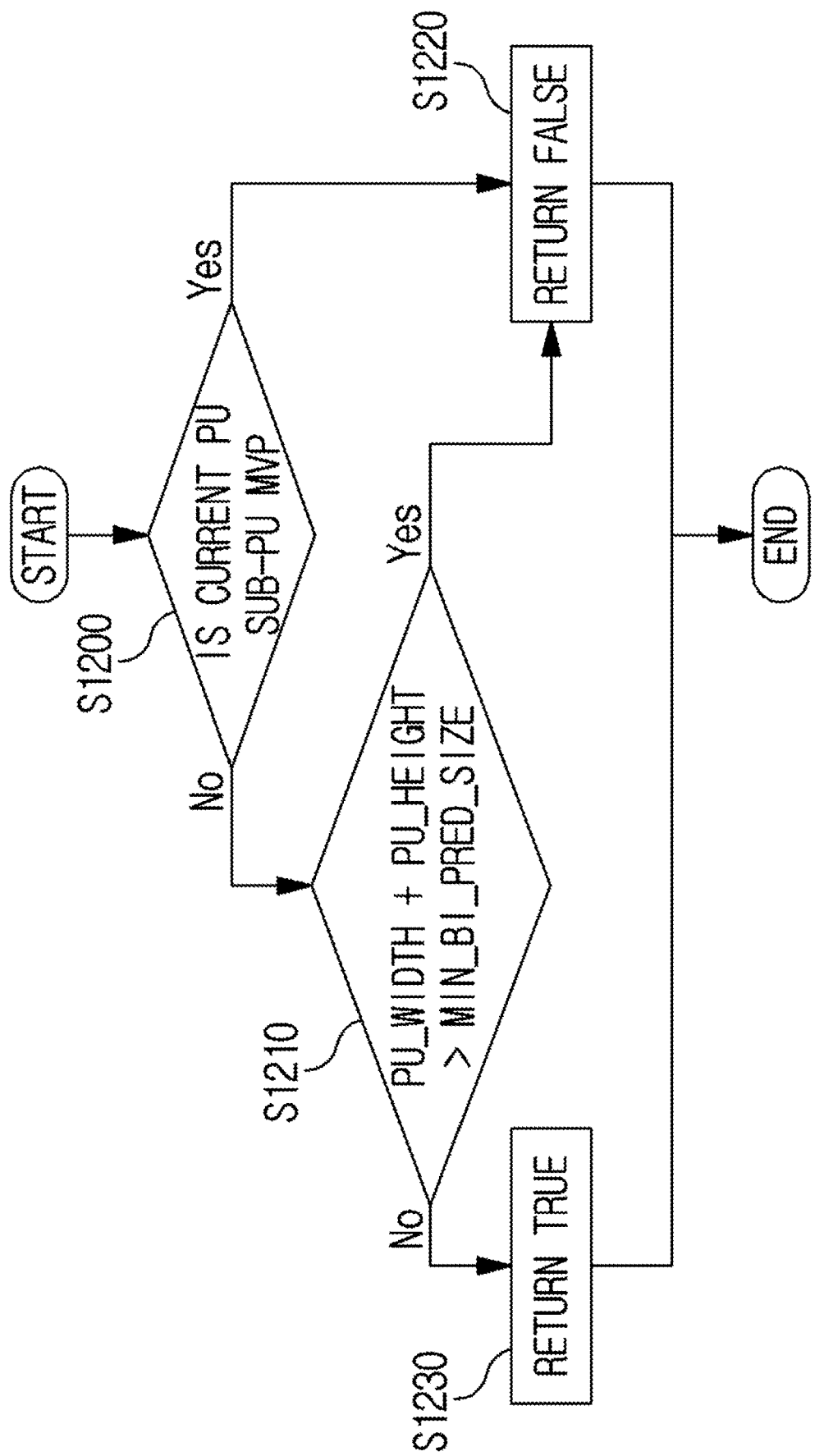
FIG. 12 is a flowchart for determining whether a prediction directionality is limited according to an embodiment of the present disclosure.

FIG. 12 is a flowchart for determining whether a prediction directionality is limited according to an embodiment of the present disclosure.

FIG. 12 is a flowchart illustrating a step of determining whether to limit a prediction directionality of a current block, and whether to limit the prediction directionality of the current block may be used not only in a step of encoding and/or decoding the prediction directionality of the current block, but also in a step of setting the prediction directionality of the current block.

The step of setting the prediction directionality of the current block may mean a case in which the prediction directionality of a predefined motion candidate is set as the prediction directionality of the current block without going through a step of encoding and/or decoding the prediction directionality of the current block when the current block is encoded and/or decoded in skip mode and/or merge mode.

According to the embodiment shown in FIG. 12, a step of determining whether to limit a prediction directionality of a current block may include at least one of a step of determining whether a current block is a block for performing motion prediction in units of sub-blocks (S1200) or a step of determining whether a size of a current block is a block size allowing bidirectional prediction (S1210). Additionally, when a current block is a limited bidirectional prediction block, a step of adjusting a prediction directionality, a motion vector, and a reference picture index of a current block may be included.

In determining whether the current block is a block for performing motion prediction in units of sub-blocks (S1200), it is a step of determining whether the current block is a mode in which motion prediction is performed in units of sub-blocks. The motion prediction in units of sub-blocks refers to a prediction mode in which a current block is divided into a plurality of sub-blocks and motion prediction is performed with reference to different motion vectors for each sub-block. For example, if a current block performs motion prediction in units of sub-blocks (e.g., affine mode), bidirectional prediction of a current block may not be limited, and if not (e.g., merge mode), bidirectional prediction of a current block may be limited. Even when a current block does not perform motion prediction in units of sub-blocks, it may be determined whether bidirectional prediction of a current block is limited by further considering a size of a current block, as described later.

In determining whether a size of a current block is a size of a block that allows bidirectional prediction (S1210), it is determined whether a size of a current block is a size of a block that allows bidirectional prediction that is predefined or transmitted in higher-level syntax.

In this case, the size of the block that allows bidirectional prediction that is predefined or transmitted in higher-level syntax may be expressed as a sum of a width of the block and a height of the block, or a product of a width of the block and a height of the block.

In this case, the size of the block may be 12 derived from (8+4) or (4+8), or 16 derived from (8+8) with respect to a sum of a width of the block and a height of the block. In addition, the size of the block may be 32 derived from (4×8) or (8×4), or 64 derived from (8×8) with respect to a product of a width of the block and a height of the block.

For example, if a size of a current block is less than or equal to a predetermined threshold value, bidirectional prediction of a current block may be limited, otherwise, bidirectional prediction of a current block may not be limited. Herein, the threshold value may be different according to a method of expressing a size of a current block, and may be defined as 12, 16, 32, or 64 as described above.

When the current block is determined to be a limited bidirectional prediction block, it may further include a step of adjusting a prediction direction, a motion vector, and a reference picture index of the current block. In an embodiment of the present disclosure, when a current block is determined to be a limited bidirectional prediction block, a prediction directionality of the current block is set as a unidirectional prediction block in a L0 direction, a motion vector in a L1 direction is initialized with a (0,0) vector, and a reference picture index in the L1 direction is also initialized.

Figure 13:
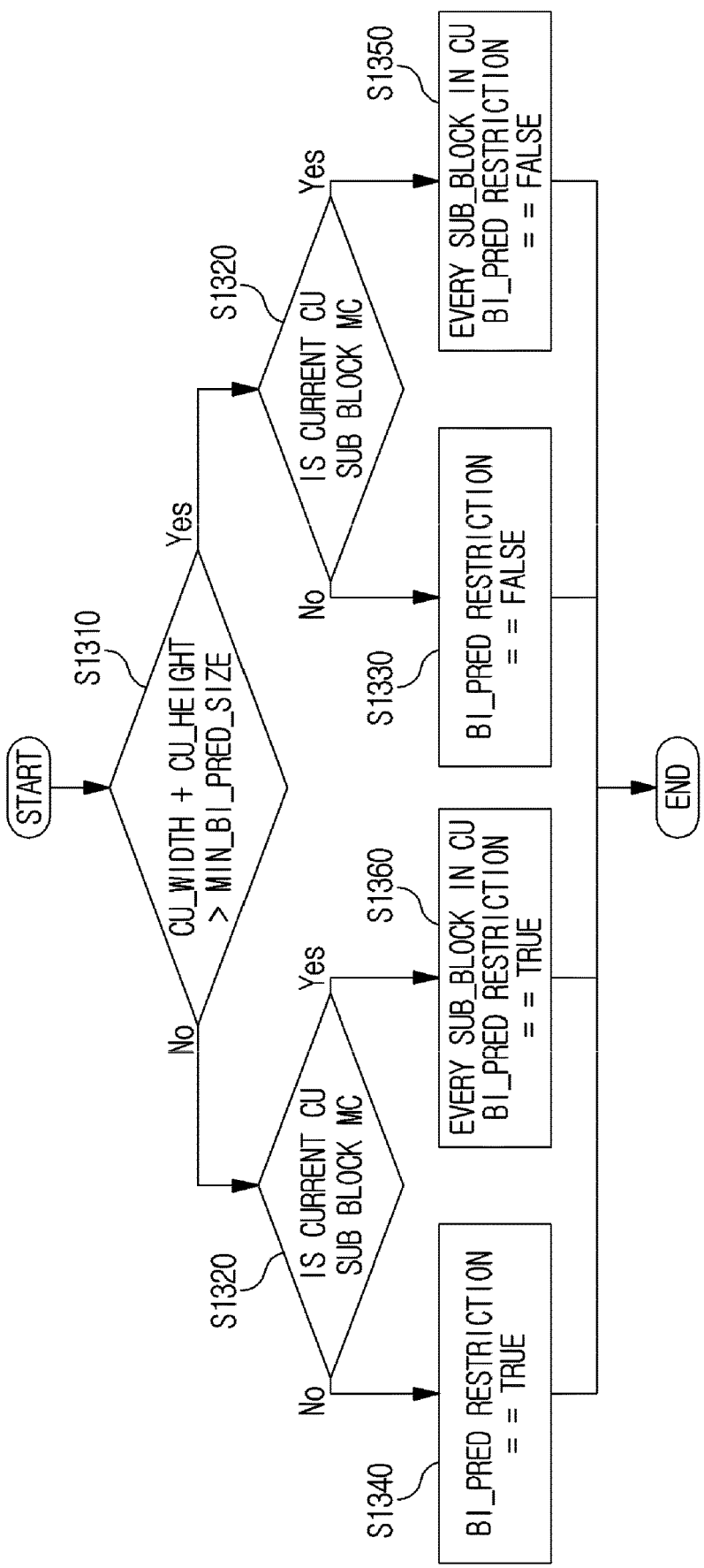
FIG. 13 is a flowchart for determining whether a prediction directionality is limited according to another embodiment of the present disclosure.

FIG. 13 is a flowchart for determining whether a prediction directionality is limited according to another embodiment of the present disclosure.

FIG. 13 is a flowchart illustrating a step of determining whether to limit a prediction directionality of a current block, and whether to limit a prediction directionality of a current block may be used not only in a step of encoding and/or decoding the prediction directionality of the current block, but also in a step of setting the prediction directionality of the current block. In addition, it may be used in a step of setting a prediction directionality of a sub-block in the current block.

The step of setting the prediction directionality of the current block may mean a case in which the prediction directionality of a predefined motion candidate is set as the prediction directionality of the current block without going through a step of encoding and/or decoding the prediction directionality of the current block when the current block is encoded and/or decoded in skip mode and/or merge mode. In addition, it may include a step of setting prediction directionalities for all sub-blocks in the current block.

According to the embodiment shown in FIG. 13, a step of determining whether to limit a prediction directionality of a current block may include at least one of a step of determining whether a size of the current block is a size of a block allowing bidirectional prediction (S1310) or a step of determining whether the current block is a block that performs motion prediction in units of sub-blocks (S1320). In addition, at least one of steps of adjusting a prediction directionality, a motion vector, and a reference picture index of the current block (S1330, S1340) or steps of adjusting prediction directionalities, motion vectors, and reference picture indexes of all sub-blocks in the current block (S1350, S1360) may be additionally included.

In determining whether a size of a current block is a size of a block that allows bidirectional prediction (S1310), it is determined whether a size of a current block is a size of a block that allows bidirectional prediction that is predefined or transmitted in higher-level syntax.

In this case, the size of the block that allows bidirectional prediction, which is predefined or transmitted in higher-level syntax, may be expressed as a sum of a width of the block and a height of the block, or a product of a width of the block and a height of the block.

In this case, the size of the block may be 12 derived from be (8+4) or (4+8), or 16 derived from (8+8), with respect to a sum of a width of the block and a height of the block. In addition, the size of the block may be 32 derived from (4×8) or (8×4), or 64 derived from (8×8) with respect to a product of a width of the block and a height of the block.

In determining whether a current block is a block for performing motion prediction in units of sub-blocks (S1320), it is a step of determining whether the current block is a mode in which motion prediction is performed in units of sub-blocks. The motion prediction in units of sub-blocks refers to a prediction mode in which a current block is divided into a plurality of sub-blocks and motion prediction is performed with reference to different motion vectors for each sub-block.

A step of adjusting a prediction directionality, a motion vector, and a reference picture index of the current block (S1330 and S1340) may be included. In an embodiment of the present disclosure, when a current block is determined to be a limited bidirectional prediction block, a prediction directionality of the current block is set as a unidirectional prediction block in a L0 direction, a motion vector in a L1 direction is initialized with a (0,0) vector, and a reference picture index in the L1 direction is also initialized.

Steps (S1350 and S1360) of adjusting prediction directionalities, motion vectors, and reference picture indexes of all sub-blocks in the current block may be included. In an embodiment of the present disclosure, when a current block is determined to be a limited bidirectional prediction block, prediction directionalities of all sub-blocks in the current block are set as a unidirectional prediction block in a L0 direction, motion vectors in a L1 direction are initialized with a (0,0) vector, and reference picture indices in the L1 direction are also initialized.

Figure 14:
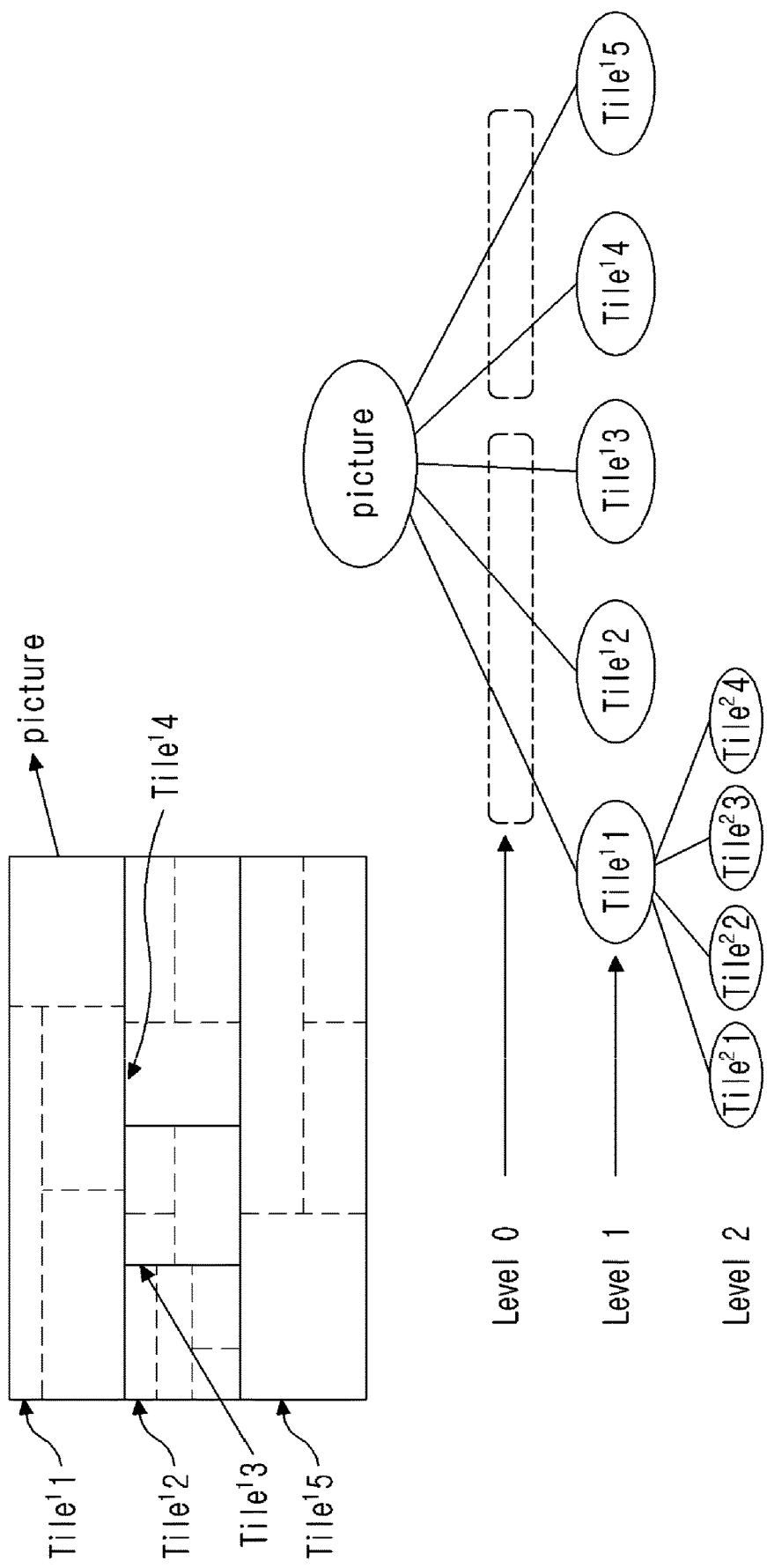
FIG. 14 illustrates a concept of dividing one picture using a unit defined as multiple layers according to an embodiment of the present disclosure.

FIG. 14 illustrates a concept of dividing one picture using a unit defined as multiple layers according to an embodiment of the present disclosure.

In decoding an image and a video, one image may be grouped into a plurality of image blocks and may be independently decoded. In this case, a predetermined fragment region may be defined by grouping the plurality of image blocks. Herein, the fragment region may mean at least one of a sub-picture, a slice, a tile, a sub-tile (brick), or a CTU.

For example, one picture may be divided into one or more sub-pictures. A sub-picture may be composed of one or more slices, or may be composed of one or more tiles. It may be limited so that one slice does not span a plurality of sub-pictures. Alternatively, it may be limited so that one tile does not span a plurality of sub-pictures.

For division into sub-pictures, one picture may be divided in vertical and horizontal directions at k-grid intervals. An index may be assigned to each grid. An index may be signaled for each grid. Grouping may be performed for each grid with the same index. A group of grids with the same index may be defined as a sub-picture. The k-grid refers to k sample units, and k may be 4, 8, 16, 32, 64 or more. The k-grid may be determined to be the same as a width and/or a height of a CTU pre-promised to an encoding/decoding apparatus.

The slice may be composed of one or more tiles, or may be composed of one or more bricks. Slices may be replaced with the term tile group. The slice may be specified based on a position of a top left tile (or brick) and a bottom right tile (or brick). In this case, the slice may be implemented in a rectangular shape. A tile may be composed of one or more of bricks. It will be described later using a term tile or tile group. However, a tile or a tile group may be understood as being replaced with a sub-picture, a slice, a tile, or a brick.

As shown in FIG. 14, a single image may be reconstructed by dividing it in a rectangular shape such as Tile1_1 to Tile1_5. In this case, one tile may be divided into one or more tiles. This concept may be called a sub-tile. Conversely, one or more tiles may be grouped together and called a tile group. Looking at this concept hierarchically, it may be expressed as multi-level tile division. A tile refers to a group of one or more coding tree units (CTU), where a bottom right boundary of the tile may not include a complete CTU. A Tile group and a sub-tile may or may not have a rectangular shape. In a case of a tile group, an entire reconstructed image is determined according to an arrangement of tiles and a form of a bundle. In the case of a sub-tile, it may be represented as a bundle of a plurality of CTUs inside a tile, and may be rectangular or may have a shape of a slice according to a raster scanning order.

First, information for dividing one image into a plurality of tiles may be delivered as a part of header information of a compressed bitstream. First, a video or image is reconstructed according to division information of tiles for one image group or one image. In expressing a shape of a tile, it may be expressed by the number of tiles and a width and height of each tile. In this case, an order of indicating a tile shape information may be assumed to be a raster scanning order. In FIG. 14, when there are 5 tiles, a structure of a tile may be sequentially reconstructed at a receiving end by using information indicating that it is composed of five tiles first, and width and height information starting from the first tile.

In addition, each tile may be divided into sub-tiles, and at a receiving end, it is possible to reconstruct how each tile is composed of sub-tiles by using information on how many sub-tiles each tile is composed of, and position and size information such as a width and height of each sub-tile.

In addition, each tile may be grouped into several groups, and an image may be reconstructed in one bundle. The tile group may be represented by a method of expressing the number of tile groups and the tile number or order of each tile group, and the structure of the tile group may be reconstructed at the receiving end.

A tile represents a unit capable of independently reconstructing an image. As a result, image reconstruction may be performed independently at the same time when bitstream information exists regardless of an order of a plurality of tiles. According to an image group or an image, a mutually reconstructed image between tiles may or may not be referred to according to higher-level header information. In the case of a still image, each tile may be completely independently reconstructed or may be reconstructed through reference between tiles. As an example, when a reconstructed image that is temporally identical and spatially different is referred to, such as an IBC mode or intra prediction, reference may be limited within a tile, and reference between tiles may be allowed according to higher-level information. Even in the case of motion compensation, reference between tiles may not be possible according to higher-level information, or reference between tiles may be allowed. Whether such a space or time reference is possible may be applied as the same concept in a sub-tile. Entropy decoding may be performed independently of each other, and in some cases, decoding may be performed using some information of a previous sub-tile. It is possible to disable or enable spatial and temporal prediction between these sub-tiles. It may also be applied to the tile group mentioned above. Each tile may independently perform entropy decoding, but spatial temporal prediction decoding may be performed only within a tile group. Whether to apply filtering to a boundary of a reconstructed image between these tiles, between tile groups, or between sub-tiles is determined according to higher-level header information. Herein, the filtering may refer to a filter such as a deblocking filter, a sample adaptive offset (SAO), an adaptive loop filter (ALF), etc. included in an in-loop filter in an image encoding and decoding apparatus.

Herein, the sub-tile may be separately entropy-decoded like a tile. Alternatively, a first sub-tile may independently start decoding, and a subsequent consecutive sub-tile may perform entropy decoding using a part of decoding information of the previous tile. Alternatively, it means that entropy decoding may be performed using reconstructed image information of a previous tile. This multi-level image division may be extended to multiple layers.

Figure 15:
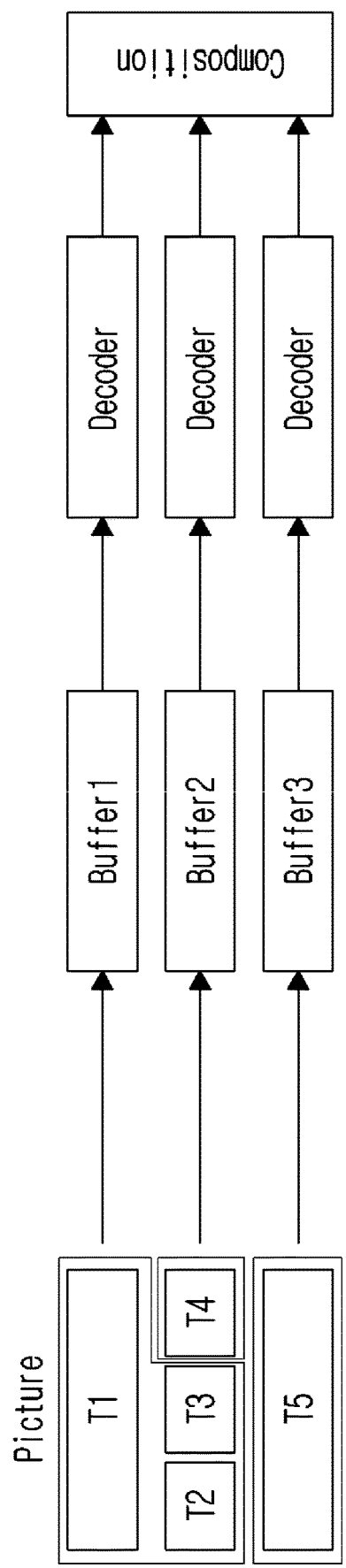
FIG. 15 illustrates a concept of dividing an image, an image group, or a video into a plurality of tiles and processing them into three tile groups according to an embodiment of the present disclosure.

FIG. 15 illustrates a concept of dividing an image, an image group, or a video into a plurality of tiles and processing them into three tile groups according to an embodiment of the present disclosure.

In FIG. 15, an image, an image group, and a video are divided into a plurality of tiles, when these are grouped into three tile groups, each tile group is collected in a separate buffer, and only a reconstructed image corresponding to a tile are shared, and an image corresponding to the tile group may be restored.

In this case, each tile may be entropy-decoded separately or may be reconstructed in an interdependent manner. As previously described, it is possible to turn on/off spatiotemporal prediction through sharing of reconstructed images and images between tiles, between tile groups, or between sub-tiles and the application of filtering to a boundary region between them, and it may be signaled using a higher-level syntax.

In this embodiment, a tile group may be replaced by a sub-picture or a slice, and a tile and a sub-tile may be replaced by a slice and a brick, and the same may be applied to an embodiment described later.

Figure 16:
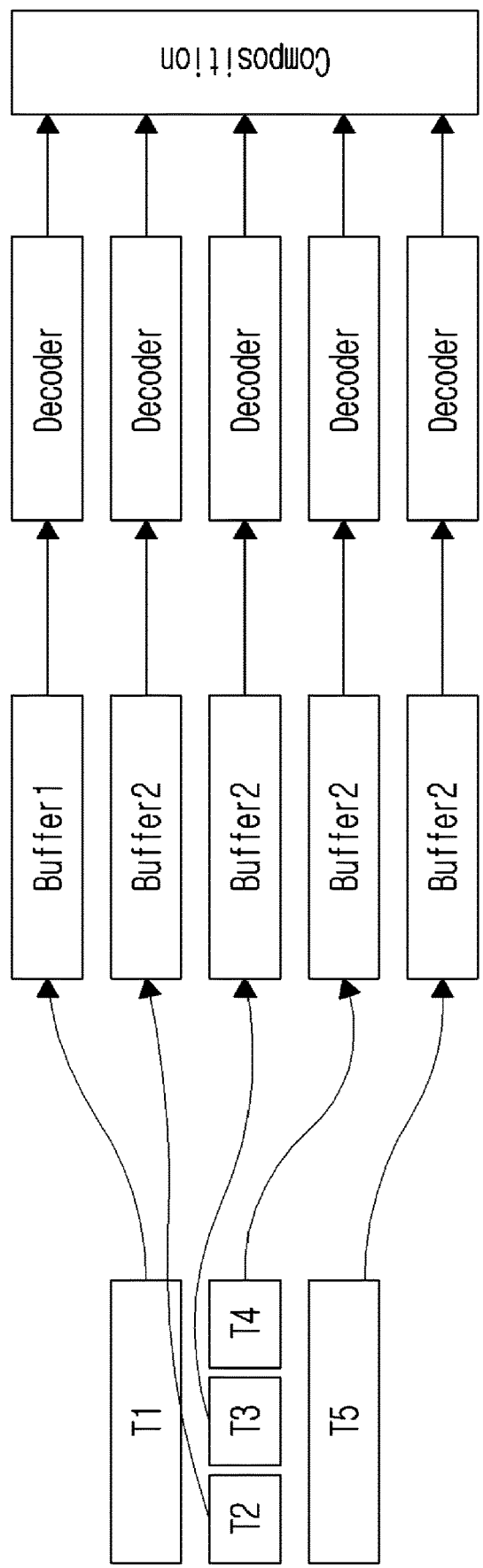
FIG. 16 illustrates a concept in which an image, an image group, or an image is divided into a plurality of tiles, and only a reconstructed image corresponding to each tile is shared and restored according to an embodiment of the present disclosure.

FIG. 16 illustrates a concept in which an image, an image group, or an image is divided into a plurality of tiles, and only a reconstructed image corresponding to each tile is shared and restored according to an embodiment of the present disclosure.

In FIG. 16, an image, an image group, and a video are divided into a plurality of tiles, each tile is collected in a separate buffer, and only a reconstructed image corresponding to a tile is shared, and an image corresponding to the tile may be reconstructed.

In this case, each tile may be entropy-decoded separately or may be reconstructed in an interdependent manner. As previously described, it is possible to turn on/off spatiotemporal prediction through sharing of reconstructed images and images between tiles or between sub-tiles and the application of filtering to a boundary region between them, and it may be signaled using a higher-level syntax.

Figure 17:
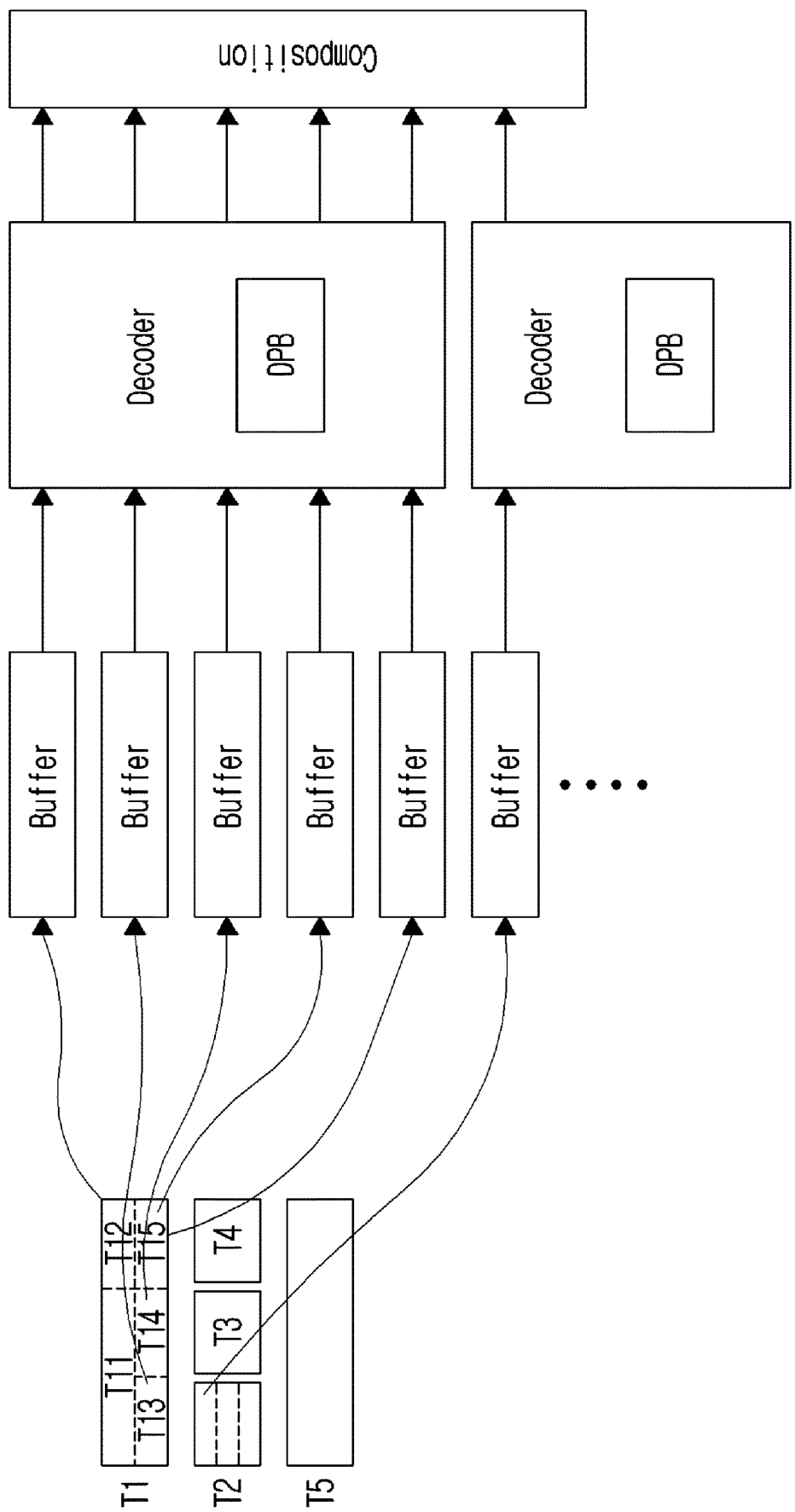
FIG. 17 illustrates an example in which an image, an image group, or a video are divided into a plurality of tiles, and each tile is divided into sub-tiles according to an embodiment of the present disclosure.

FIG. 17 illustrates an example in which an image, an image group, or an image are divided into a plurality of tiles, and each tile is divided into sub-tiles according to an embodiment of the present disclosure.

FIG. 17 shows an example in which one image, an image group, and a video are divided into a plurality of tiles, and each tile is divided into sub-tiles again. In this case, sub-tiles are collected in a separate buffer, and only a reconstructed image corresponding to a tile is shared, and an image corresponding to the tile may be reconstructed.

In this case, each sub-tile may be entropy-decoded separately or may be reconstructed in an interdependent manner. Interdependent manner refers to referencing update information of a context table for entropy decoding. As previously described, it is possible to turn on/off spatiotemporal prediction through sharing of reconstructed images and images between tiles or between sub-tiles and the application of filtering to a boundary region between them, and it may be signaled using a higher-level syntax.

HRD (Hypothetical Reference Decoder) mutually determines a size of a buffer and delay information on a decoder side in order to smoothly restore and display a video in real time by receiving a compressed bitstream between a decoder and an encoder at a limited rate. Accordingly, in order to receive and restore data at a limited rate, and to output it in real time, on the decoder side, according to information such as a size of a buffer defined in a bitstream, a delay time, and a transmission rate, it is also necessary to set the decoder to perform the restoration. A size of a buffer, a delay time, a transmission rate, or the amount of filling an initial buffer may be defined, and with some of these information, other information may be obtained in a proportional manner.

It has been described that the aforementioned multi-level tiles or multi-layer tiles may be independently or dependently encoded or decoded. HRD may be defined in multiple levels with information on such a multi-level tile or a multi-layer tile. HRD for an image, an image group, or an entire video may be defined. In addition, HRD information may be defined for each tile, and accordingly, each tile may independently change the amount of buffer and delay. Alternatively, a size of a buffer, a delay, the amount of an initial buffering, and a transmission rate may be considered. By extending this concept, such HRD may be adjusted for each tile group. In addition, according to this concept, HRD may be separately set for a sub-tile, and accordingly, a decoder may reconstruct an image or video according to information such as a size of a buffer and a delay according to a separate HRD. In addition, it may be possible to infer these multi-level HRD rules between levels. That is, when HRDs are defined for each sub-tile, the HRD for a tile may be inferred as an average, maximum, minimum, and sum of HDR information for the sub-tiles. For example, a size of a buffer for a corresponding tile may be set with a size obtained by summing buffer sizes of sub-tiles. Alternatively, in the case of an initial delay for a tile, the maximum value of initial delays for sub-tiles may be used. This hierarchical HRD may be transmitted for an image, an image group, or an entire video. In particular, in the case of an image group, it may be defined in a random access point image. In the case of two-way image communication, HRD may be defined according to terminal performance by exchanging the terminal performance in advance between devices or between a terminal and a server. For the convenience of transmitting the hierarchical HRD information, HRD may be defined according to the number of tiles, the number of tile groups, and the number of sub-tiles according to tile structure information. Alternatively, whether to define HRD according to a tile, and a size of a buffer and a delay for each HRD may be defined, or shared information may be used.

In the case of a special video such as a 360-degree video, for one image or video, only tiles and tile groups of only a portion of the area may be reconstructed. In this case, according to tile information and cross reference information, a bitstream buffer of a decoder and a reconstructed image may be used separately. In addition, in a video, a tile or tile group to be selectively reconstructed may be changed according to time, and accordingly, HRD must be selectively configured to receive and reconstruct an image.

Video compression and reconstruction is divided into an intra-encoded/decoded image and an inter-encoded/decoded image. In this case, an intra prediction and reconstruction technology is included in an inter-encoded/decoded image, but an inter prediction and reconstruction technique is not applied to an intra-encoded/decoded image. In addition, an intra-encoding/decoding slice and an inter-encoding/decoding slice are defined, an intra-encoding/decoding slice uses only intra-block encoding/decoding technology, and an inter-encoding/decoding slice uses both intra-block and inter-block encoding/decoding technologies. In addition, an intra tile may use only an intra-block encoding/decoding technology, and an inter tile may use both an intra-block encoding/decoding technology and an inter-block encoding/decoding technology. In addition, in an inter-tile, intra prediction reconstruction without using information reconstructed by a neighboring inter-block coding/decoding technology, such as CIP (Constraint intra prediction), may be performed. A shape of the intra tile is defined by several patterns, so that after several image frames have passed, a subsequent image may be reconstructed regardless of a previous error. In addition, a decoder side may remove an image reconstructed before a pattern period from DPB at the time when the image is completely reconstructed according to a pattern of an intra tile or CIP.

Various embodiments of the present disclosure are not listed as listing all possible combinations, but are intended to describe representative aspects of the present disclosure, and matters described in the various embodiments may be applied independently or may be applied in combination of two or more.

In addition, various embodiments of the present disclosure may be implemented by hardware, firmware, software, or a combination thereof. In the case of implementation by hardware, it can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processors, controllers, microcontroller, microprocessor, etc.

The scope of the present disclosure includes software or machine-executable instructions (e.g., operating system, application, firmware, program, etc.) that allow an operation according to a method of various embodiments to be executed on a device or a computer, and a non-transitory computer-readable medium in which the software or instructions are stored and executed on a device or a computer.

INDUSTRIAL AVAILABILITY

The present disclosure may be used to encode/decode an image.

The invention claimed is:

1. A method of decoding an image signal with a decoding apparatus, comprising:
receiving, with the decoding apparatus, a bitstream including the image signal;
constructing, with the decoding apparatus, a merge candidate list of a current block, the merge candidate list including a plurality of merge candidates, the plurality of merge candidates including at least one of a spatial merge candidate, a temporal merge candidate, or a combined merge candidate;
deriving, with the decoding apparatus, motion information of the current block based on a merge candidate specified by a merge index among the plurality of merge candidates in the merge candidate list, the motion information including at least one of a prediction direction, a motion vector, or a reference picture index; and
performing, with the decoding apparatus, inter prediction on the current block based on the derived motion information,
wherein, in response to a case in which the current block uses geometric partitioning-based motion prediction, the prediction direction of the current block is restricted so that a first partition and a second partition resulting from geometric partitioning of the current block have only one of a L0 prediction direction or a L1 prediction direction, respectively,
wherein whether the first or second partition has the L0 prediction direction or not is variably determined based on the merge index specifying one of the plurality of merge candidates in the merge candidate list,
wherein reference picture indexes of L0 and L1 directions for the combined merge candidate are derived based on a reference picture index of one of a first merge candidate or a second merge candidate, and
wherein the one of the first merge candidate or the second merge candidate represents a merge candidate having a smallest candidate index among a candidate index of the first merge candidate and a candidate index of the second merge candidate.

2. The method of claim 1, wherein a shape of at least one of the first and second partitions is triangular.

3. The method of claim 1,
wherein a motion vector of a L0 direction for the combined merge candidate is derived as an average of a motion vector of a L0 direction for the first merge candidate and a motion vector of a L0 direction for the second merge candidate, and
wherein a motion vector of a L1 direction for the combined merge candidate is derived as an average of a motion vector of a L1 direction for the first merge candidate and a motion vector of a L1 direction for the second merge candidate.

4. A method of encoding an image with an encoding apparatus, comprising:
obtaining, with the encoding apparatus, a prediction block of a current block based on motion information of the current block, the motion information being obtained from one of a plurality of merge candidates in a merge candidate list, the motion information including at least one of a prediction direction, a motion vector, or a reference picture index, the plurality of merge candidates including at least one of a spatial merge candidate, a temporal merge candidate, or a combined merge candidate;
obtaining, with the encoding apparatus, a residual block including residual data of the current block based on the prediction block and an original block of the current block; and
generating, with the encoding apparatus, a bitstream by encoding the residual data of the residual block,
wherein a merge index is encoded to specify the one of the plurality of merge candidates in the merge candidate list,
wherein, in response to a case in which the current block uses geometric partitioning-based motion prediction, the prediction direction of the current block is restricted so that a first partition and a second partition resulting from geometric partitioning of the current block have only one of a L0 prediction direction or a L1 prediction direction, respectively,
wherein whether the first or second partition has the L0 prediction direction or not is variably determined based on the merge index specifying one of the plurality of merge candidates in the merge candidate list,
wherein reference picture indexes of L0 and L1 directions for the combined merge candidate are derived based on a reference picture index of one of a first merge candidate or a second merge candidate, and
wherein the one of the first merge candidate or the second merge candidate represents a merge candidate having a smallest candidate index among a candidate index of the first merge candidate and a candidate index of the second merge candidate.

5. A non-transitory computer-readable medium containing instructions that, when executed by a processor, cause a device to process an image signal,
wherein a prediction block of a current block is obtained based on motion information of the current block,
wherein the motion information is obtained from one of a plurality of merge candidates in a merge candidate list,
wherein the motion information includes at least one of a prediction direction, a motion vector, or a reference picture index,
wherein the plurality of merge candidates includes at least one of a spatial merge candidate, a temporal merge candidate, or a combined merge candidate,
wherein a residual block including residual data of the current block is obtained based on the prediction block and an original block of the current block,
wherein encoding the residual data of the residual block is encoded, wherein a merge index is encoded to specify the one of the plurality of merge candidates in the merge candidate list, wherein, in response to a case in which the current block uses geometric partitioning-based motion prediction, the prediction direction of the current block is restricted so that a first partition and a second partition resulting from geometric partitioning of the current block have only one of a L0 prediction direction or a L1 prediction direction, respectively, wherein whether the first or second partition has the L0 prediction direction or not is variably determined based on the merge index specifying one of the plurality of merge candidates in the merge candidate list, wherein reference picture indexes of L0 and L1 directions for the combined merge candidate are derived based on a reference picture index of one of a first merge candidate or a second merge candidate, and wherein the one of the first merge candidate or the second merge candidate represents a merge candidate having a smallest candidate index among a candidate index of the first merge candidate and a candidate index of the second merge candidate.

* * * * *